United States Patent [19]
Anderson et al.

[11] Patent Number: 5,842,216
[45] Date of Patent: Nov. 24, 1998

[54] SYSTEM FOR SENDING SMALL POSITIVE DATA NOTIFICATION MESSAGES OVER A NETWORK TO INDICATE THAT A RECIPIENT NODE SHOULD OBTAIN A PARTICULAR VERSION OF A PARTICULAR DATA ITEM

[75] Inventors: David Anderson, Belmont; Richard C. Waters, Concord, both of Mass.

[73] Assignee: Mitsubishi Electric Information Technology Center America, Inc., Cambridge, Mass.

[21] Appl. No.: 642,345

[22] Filed: May 3, 1996

[51] Int. Cl.⁶ .................................................. G06F 15/163
[52] U.S. Cl. .................... 707/203; 395/712; 395/200.33; 707/201
[58] Field of Search ......................... 395/185.01, 200.18, 395/617, 200.33, 712; 707/201, 203

[56] References Cited

U.S. PATENT DOCUMENTS

| | | | |
|---|---|---|---|
| 4,007,450 | 2/1977 | Haibt et al. | 395/200.56 |
| 4,641,274 | 2/1987 | Swank | 395/793 |
| 5,278,979 | 1/1994 | Foster et al. | 395/619 |
| 5,485,575 | 1/1996 | Chess et al. | 395/183.1 |
| 5,579,318 | 11/1996 | Reuss et al. | 370/410 |
| 5,581,704 | 12/1996 | Barbara et al. | 395/200.09 |
| 5,600,834 | 2/1997 | Howard | 395/617 |
| 5,630,116 | 5/1997 | Takaya et al. | 707/201 |

*Primary Examiner*—Kenneth S. Kim
*Attorney, Agent, or Firm*—Robert K. Tendler

[57] ABSTRACT

A system is provided for eliminating time-consuming, unnecessary transfers of data over networks such as the the World Wide Web while at the same time guaranteeing timeliness of the data used by recipients. Timeliness is assured by immediately sending small data-notification messages whenever data becomes relevant or changes. Efficiency is guaranteed by transmitting the data itself only when requested by the recipient of a data-notification message. In particular, recipients are alerted to the presence of, and changes in, data they might use by data-notification messages containing a timestamp, the data location, and a checksum. Based on the timestamp, the recipient can determine whether the data-notification message contains timely information or should be ignored. Based on the data location and checksum, the recipient can determine whether it already has the current version of the data in question, for example stored in a cache.

9 Claims, 6 Drawing Sheets

NETWORK MESSAGE

CACHE ENTRY

SYSTEM FOR SENDING SMALL POSITIVE DATA NOTIFICATION MESSAGES OVER A NETWORK TO INDICATE THAT A RECIPIENT NODE SHOULD OBTAIN A PARTICULAR VERSION OF A PARTICULAR DATA ITEM

FIELD OF THE INVENTION

This invention relates to the efficient and timely communication and update of data stored in a repository such as one or more World Wide Web servers to a number of nodes using that data in a computer network, and more particularly to the use of checksums and timestamps to indicate version changes for the data.

BACKGROUND OF THE INVENTION

In networked applications involving many users widely dispersed on the Internet working with a collection of many large evolving data files, the problem arises as to how the existence and contents of these files are communicated to the various users. When data is stored in the World Wide Web, the location of each data file is named by a Uniform Resource Locator, or URL. Users find out about the existence of data files via URLs stored in other files or otherwise communicated to them. Users interact with the data using a 'web browser', which can fetch the data corresponding a URL.

The most straightforward way to ensure that a user will always have timely up-to-date information about the contents of a given data file is for a web browser to fetch the contents of the file from its source whenever a user wishes to inspect or otherwise use the data referred to by a URL. However, this approach is quite unsatisfactory for several reasons. First, since these data files usually change relatively slowly, the same identical file contents are typically fetched many times if a user uses the same URL many times. This wastes network bandwidth. Second, since each fetch takes a considerable amount of time, i.e., has high latency, a user has to wait for a considerable amount of time every time he wishes to use a URL. This wastes the user's time.

To attempt to overcome these problems, typical web browsers store local copies of data files they have retrieved via URLs. This approach, which is referred to as 'caching', means that while it is costly to retrieve a file the first time it is used, the data can be obtained with no network usage and very little time delay for subsequent use.

Caching is essential, because it leads to a dramatic improvement in network efficiency and URL access speed. However, it does not ensure that a user has up-to-date information about the contents of a given URL. Quite the contrary, as soon as the data file referred to by a URL changes, cached copies of the file become obsolete, and any user using a cached copy is using incorrect data.

To counteract this problem with caching, typical web browsers retrieve not only the data corresponding to a URL, but also a time-to-live record indicating how long the data is expected to be valid. Once this time has expired, the data is removed from the cache so that it will be re-retrieved the next time the user consults the URL.

This time-to-live approach is better than caching with no time limit. However, it still does not ensure that a user has up-to-date information about the contents of a given URL. The problem is that, for all but a very few URLs, it is not possible to predict in advance when the next change in the data will occur. If the predicted time-to-live is too short, then the data will be wastefully re-retrieved even though it has not changed. If the predicted time-to-live is too long, then the user will end up using obsolete data.

Because caching, with or without time-to-live indications, does not guarantee up-to-date data, users are forced to explicitly request the re-retrieval of data whenever they want to be sure that they have up-to-date information. This is inefficient because most of the time, the data that is re-retrieved has not changed and is therefore unnecessarily transmitted. This also wastes the user's time, because he has to wait until the entire data file has been re-retrieved before he can know whether it has changed. This is also awkward, because the boundaries between sources of data are often not made apparent to the user, and therefore it can be difficult for a user to know when explicit requests for re-retrieval have to be made.

What is needed is an automatic way of detecting when the data corresponding to a URL changes and therefore must be re-retrieved, and doing the re-retrieval when and only when it is necessary.

The basic situation above involves a single user interacting with various sources of data. The problem of ensuring timely up-to-date access to changeable data is even more complex when many users are simultaneously interacting with each other and with various sources of data. The problem is greater because the heavy network demands of multi-user interaction mean that avoiding the waste and delay of unnecessary re-retrievals of data is even more important than in a single-user situation. In addition, further complications arise because it is important that when a data file changes, all the interacting users see this change at the same time.

For example, consider applications involving networked multi-user virtual environments. In these applications users interact in a three dimensional world generated by computer graphics and digital sound generation. For this to work, each user must be provided with the description of the virtual world they are in, the world being a composite of data files independently designed and controlled and brought together for the purposes of the interactive simulation. Up-to-date information about all these files must be efficiently communicated to each user in a timely fashion.

The best developed current example of a networked multi-user virtual environment is the military training system that is based on the IEEE Distributed Interactive Simulation protocol, DIS. This environment supports virtual war games in which users in simulated tanks, trucks, aircraft and other military vehicles interact in a virtual landscape.

The description of the virtual world in a networked multi-user virtual environment can be divided into two broad categories: small rapidly changing pieces of information such as the position of a particular tank or airplane, and large slowly changing data such as the appearance of parts of the landscape and individual vehicles.

The focus of the DIS protocol is the efficient low latency communication of small rapidly changing data. It sidesteps the problem of timely up-to-date communication of large slowly changing data by requiring that this data must all be communicated before a simulation begins and cannot change during a simulation. Specifically data sets representing the appearance of the vehicles, the shape of the terrain, and other artifacts are pre-stored at each network node, and linked directly into the simulation programs. Updates can only be introduced through a cumbersome process of notification to each of the users, oftentimes involving electronic mail to specify that new data is available and instructions for downloading and installation.

In order to support a wider variety of applications, such as iron-stop networked virtual environments in which users can generate their own spaces, it is essential to support the communication and update of large slowly changing simulation data while a simulation is in progress. This must be done very efficiently because network communication is at a premium in such a simulation. In addition, it must be done without user intervention, because it is desired that users concentrate wholly on the simulation itself, not on the underlying communication mechanisms.

Again, what is needed is an automatic way of detecting when remotely controlled data changes and therefore must be reloaded, and doing the reloading when and only when it is necessary.

SUMMARY OF INVENTION

A fundamental conflict underlies the problem of ensuring access to remote data that is timely and up-to-date as well as efficient and low-latency. To ensure timely up-to-date access to remote data, there has to be frequent communication of information about what versions of what data are available. However, to ensure efficient low-latency access to remote data, the data has to be cached locally and there must be very infrequent communication of the data itself.

The subject invention solves this problem by separating the communication of information about the state of data from the communication of the data itself. In particular, the subject system uses the frequent communication of small data-notification messages to ensure that data is timely and up-to-date while minimizing the number of times the data itself has to be communicated.

The key components of a data-notification message are a data location and a checksum on the data. The data location specifies where the data can be found. For example, when operating over the World Wide Web, the data location is specified using a URL. The checksum acts as a compact fingerprint indicating the version of the data, by summarizing the contents of the file.

It will be appreciated that the standard way of referring to versions of a data file is via a version number that is incremented each time the file is changed. However, the problem with version numbers is that their relationship to a data file is entirely arbitrary. Unless the version number is explicitly stored in the file, there is no way to look at a copy of the file in isolation and determine what version the copy corresponds to. Unfortunately, most standard data formats do not contain version numbers. Further, those that do contain the version numbers store these numbers in different places and use incompatible version numbering schemes. In addition, it is typically all too easy to change the data in a file while forgetting to change the version number. Thus, in summary, version numbers are not uniformly available, cumbersome to deal with, and not totally reliable as an indicator of whether a data file has changed.

In contrast to version numbers, whose association with a file is arbitrary, a checksum is computed from the data in a file. This gives checksums three key advantages. First, they can be applied to any kind of file without making any changes in or assumptions about standard formats. Second, they can be uniformly applied to all files. Third, they are almost completely reliable. Since they are computed from the file, it is impossible for someone to change a file while forgetting to change the checksum.

A variety of different checksum algorithms are available; however, they all have the property that they summarize the file as a whole using a small number of bits and with high probability, any change in the data will force a change in the checksum.

An easy to understand and easy to compute checksum algorithm is to divide the data into a series of 32-bit chunks and then add all the chunks together ignoring overflow to produce a 32-bit summary of the data as a whole. Changing any bit in the data will almost certainly change the checksum. However, there are many kinds of simultaneous changes to the data what will leave the checksum unchanged. For instance, adding 1 to one part of the data while subtracting 1 from another.

To avoid this kind of problem, more complex but much higher quality checksum algorithms have been developed such as cyclic redundancy checks, see D. V. Sarwate "Computation of cyclic redundancy checks via table look-up", Communications of the ACM, 31(8), pp. 1008–1013, 1988. Using these high quality algorithms, one can compute a 32-bit checksum that will change with extremely high probability no matter how the data is changed. In particular, using these algorithms, the probability that a typical change to the data will force the checksum to change approaches the theoretical limit of $1-2^{-32}=0.9999999998$.

If greater reliability than this is required one can use a longer checksum. Alternatively, in the extremely unlikely event that a new version of the data has the same checksum as an earlier version, one can arrange for the new version to have a different checksum by making an insignificant change to the underlying data, such as adding a blank line at the end of a text file. Almost every type of file can readily tolerate some sort of insignificant perturbation.

A final advantage of checksums is that in addition to allowing the version of a copy of a data file to be unambiguously identified, checksums can be used to verify that a data file has been correctly transmitted. The reason for this is that any errors in transmission will also change the checksum.

In summary, a data-notification message including a data location and 32-bit checksum can describe a specific version of a data file with almost total certainty in a very small space. There are several ways that data-notification messages can be used to ensure access to remote data that is timely and up-to-date as well as efficient and low-latency.

For example, data-notification messages could be used to improve the performance of web browsers as follows. This being a web-based application, URLs would be used to specify data locations. A browser would cache data files when retrieved, but instead of storing them with a time-to-live indicator would store them with their checksums. Whenever the user wishes to inspect or otherwise use the data referred to by a URL, the browser would send a data-notification message to the source of the data in question including the checksum of the cached data and requesting that new data be sent if and only if the cached data is out of date. This approach allows the accuracy of the cached data to be checked frequently while ensuring that the data itself is transmitted only when the data has changed and the user wants to use it. The ability to cache World Wide Web data during and across sessions with notification when the data changes, avoids the presentation of stale data while retaining good performance.

Using data-notification messages with checksums in a web browser would permit a simple, rapid indication of versions, while at the same time providing a simplified verification procedure to ascertain the validity of the data, as well as the fact of a version change. It will be appreciated that checksums can be utilized with data regardless of format or file type, because the checksum can be computed from the data, and need not be stored with it.

One aspect of the subject invention is that, while the system is described here in connection with networks, the version change detection system is equally applicable to situations in which some or all of the data is transmitted by other means, the method of transmission being immaterial. For instance, the data cache in a web browser or other system could be preloaded with data from a CD-ROM or magnetic media rather than over a network, which could greatly reduce system initialization time. After this preload, data-notification messages could be used over the network without prejudice to the way the data was initially loaded.

As a second example, consider the case of supporting the efficient communication of large slowly changing data in a networked multi-user virtual environment. The subject invention was developed in the course of designing a scalable platform for networked multi-user virtual environments, called Spline. As an illustration, the following describes the way the subject invention operates in Spline.

To start with, it must be realized that the situation is somewhat different in Spline than in the web browser example in several ways. First, in the web browser example, there is an enormous amount of data the user might choose to use at any given moment and therefore only the user can tell what he will want next. Therefore it is appropriate that the data-notification messages flow from the user to the sources of data. In contrast, in a multi-user virtual environment, it can be reliably predicted what large slowly changing data a given user needs access to based on where the user is in the virtual world. For instance, he needs to access the description of the landscape immediately surrounding him and the descriptions of the various objects near him. As a result, since the user's need for data can be externally predicted, it is appropriate for data-notification messages in Spline to flow from the sources of data to the user, rather than vice versa. The key advantage of this is that users can be informed of changes in data files the instant they happen. Further, users can be informed of the need for data somewhat in advance of the moment when it becomes essential, thereby allowing time for the data to be retrieved over the network if necessary.

Second, the network communication situation is more demanding in a networked multi-user virtual environment than when using a web browser. In particular, the messages containing small rapidly changing data, e.g., positions of objects, must be communicated with very low latency. The only practical way to achieve this low latency when communicating between large numbers of users is to utilize multicast messages using the User Datagram Protocol, UDP. An unfortunate aspect of this is that UDP messages are not guaranteed to arrive in order. As a result, some mechanism must be provided for ensuring that late arriving messages will not cause problems.

Specifically, suppose that a message $M_1$ is sent. Suppose also that at some later time a message $M_2$ containing new data that renders $M_1$ obsolete is sent. It is unfortunately the case that using UDP, a given user U might receive $M_1$ after $M_2$. Unless something is done to prevent it, this will cause U to end up with the obsolete data in $M_1$, rather than the up-to-date data in $M_2$.

This problem is dealt with in Spline by including a timestamp in every message and associating a timestamp with each piece of data stored by a user. Using these timestamps, it is easy to ignore data that arrives too late to be useful. Specifically in the example above, U would ignore message $M_1$ when it arrives because it contains a timestamp that is less than the timestamp on the corresponding stored data, this stored timestamp having come from $M_2$.

In Spline, the subject invention is embodied by transmitting UDP data-notification messages containing URLs with a timestamp added to each message so that data-notification messages that have arrived out of order and are no longer timely can easily be ignored. These data-notification messages are sent out by the sources of data whenever a new data file becomes available and whenever a data file changes.

An underlying assumption of this particular embodiment is that at any point in time, there is a single point of control for each data set, and thus for each URL. This means that only one site may be sending out messages about a URL, which avoids problems that could otherwise arise with sites receiving inconsistent messages from competing sources of information about a given URL.

Most of the time, a Spline process operates based on cached versions of the large slowly changing files that are needed for generating computer graphics images and digital sound. This allows very efficient low latency operation. However, a Spline process continually monitors the data-notification messages it receives in order to verify that the cached data it is using corresponds to the latest versions available and to detect when new data is needed. This latter situation arises for example, when a new kind of object enters the virtual environment for the first time.

Whenever the need for new or changed data is detected, Spline fetches the new data over the World Wide Web using the URL in the data-notification message, verifies that the data was correctly received using the checksum, and caches the data, URL, and checksum for future reference. In contrast to DIS, this mechanism allows the timely communication at runtime of all data both small and large while ensuring that the cost of retrieving large data sets is only incurred when the data is new or changes.

Multicasting URLs provides efficient, scalable communication about large data sets. Note that the sender of a multicast message has no direct knowledge of how many recipients there will be, or how widely dispersed they may be, and so it is particularly advantageous to use a naming scheme like URLs which are a lingua franca across the entire internet. Note further, that the above system allows the large data sets themselves to be reliably communicated using standard World Wide Web protocols and software, while unreliable multicast protocols and channels are used for the data-notification messages referring to the URL data, with the probability of their receipt being improved by repeated retransmission at randomized intervals.

In summary, a system is provided for eliminating time-consuming, unnecessary transfers of data over networks such as the the World Wide Web while at the same time guaranteeing timeliness of the data used by recipients. Timeliness is assured by immediately sending small data-notification messages whenever data becomes relevant or changes. Efficiency is guaranteed by transmitting the data itself only when requested by the recipient of a data-notification message. In particular, recipients are alerted to the presence of, and changes in, data they might use by data-notification messages containing a timestamp, the data location, and a checksum. Based on the timestamp, the recipient can determine whether the data-notification message contains timely information or should be ignored. Based on the data location and checksum, the recipient can determine whether it already has the current version of the data in question, for example stored in a cache. The use of checksums makes it possible for the subject system to operate in conjunction with any kind of data without any alteration of standard data formats and makes it possible for the recipient of data to independently verify that the data was correctly transmitted by computing the checksum. If, and only if, the recipient wishes to use the data and does not yet have the current version, the recipient requests transmittal of the current version. This guarantees that the data itself is sent only when absolutely necessary. In one embodiment, the data is transmitted over the World Wide Web and the data location is specified by a Uniform Resource Locator, URL.

In a further embodiment, the data-notification messages are transmitted via multicast to a large number of recipients, while allowing the large data sets themselves to be delivered through other, more suitable means.

BRIEF DESCRIPTION OF DRAWINGS

These and other features of the subject invention will be better understood taken in conjunction with the Detailed Description in conjunction with the Drawings, of which.

DETAILED DESCRIPTION

Figure 1A:
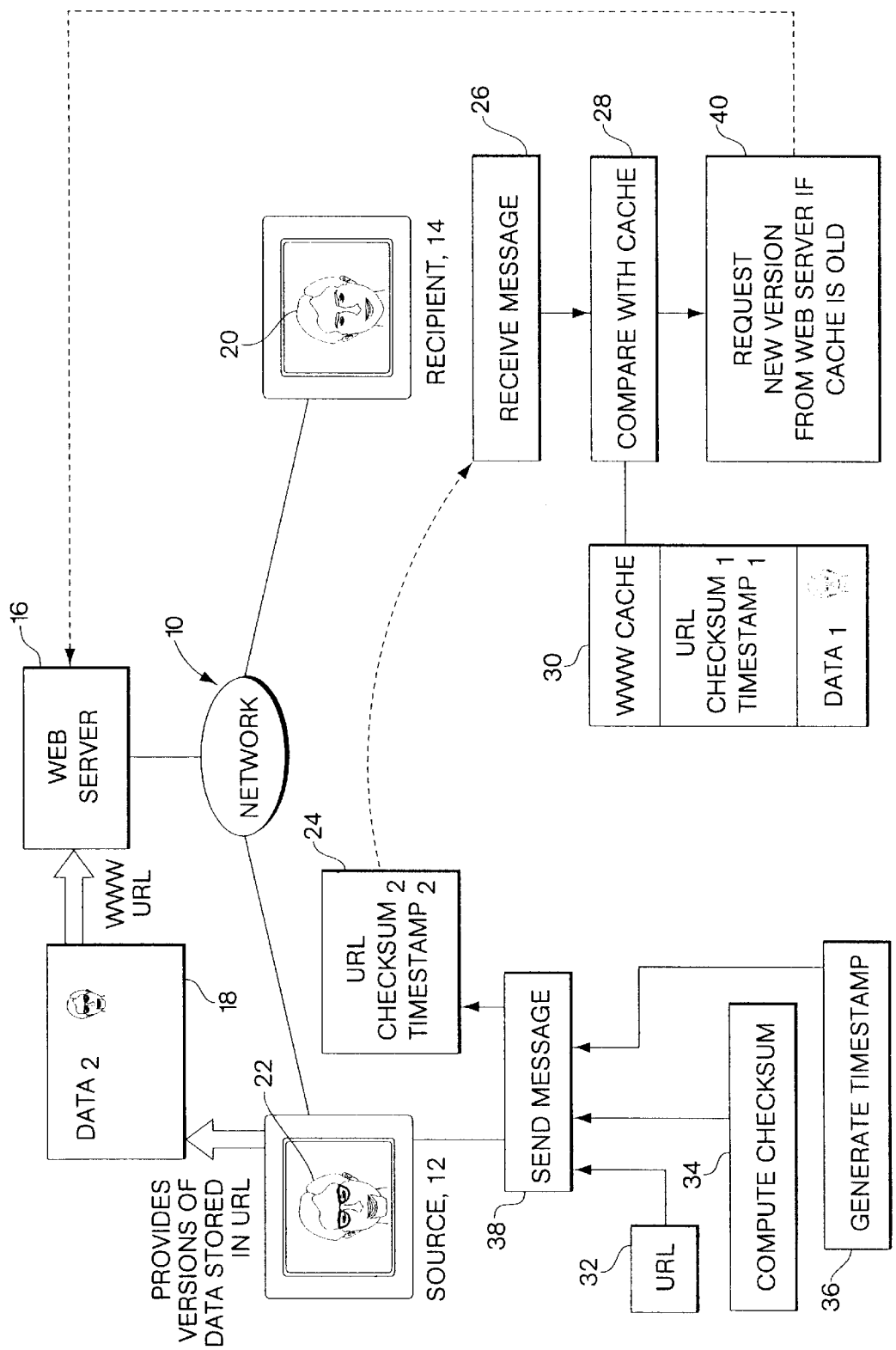
FIG. 1A is a block diagram of the subject system indicating the utilization of timestamps and checksums for the indication of a change in the data available from a network server.

Referring to FIG. 1A, a network 10 connects a source 12 and a recipient 14 at various nodes on the network. A web server 16 provided with data 18 is utilized to deliver data provided by the source to the recipient. It will be appreciated that while the system of FIG. 1A is described with the single recipient, the subject system can be utilized with multiple recipients.

FIG. 1A illustrates the situation where the data 18 provided to web server 16 has recently changed. It is important that when there is a change of data at source 12, recipient 14 be made aware of such change. The change in data is illustrated by the onscreen character 20, stored at the recipient, to be changed to the character 22 represented by data$_2$. In this case, the change involves the character represented being provided with a beard and glasses. In order to inform the recipient of the change, a checksum$_2$ and timestamp$_2$ are provided for the corresponding URL at 24 such that the message received at 26 contains the URL and the updated checksum and timestamp.

It will be appreciated that previously a message has been received by recipient 14 to indicate a particular URL and a prior checksum and timestamp. The information in this previous message, URL, checksum$_1$ and timestamp$_1$, is stored in data cache 30 along with the corresponding data data$_1$.

The information in the newly received message is compared at 28 with the cached information to determine whether a new version of the data must be retreived. It will be appreciated that if there had been no previous version of the data in the cache, then a new version of the data would of course also have to be retrieved.

Each message sent from source 12 has a particular URL 32, a computed checksum 34, and a timestamp 36, with the computed checksum being a 32-bit quantity computed by a standard checksum algorithm. A variety of different checksum algorithms are available included easy to compute but low quality algorithms such as adding together successive chunks of 32-bits and more expensive but much higher quality algorithms such as cyclic redundancy checks see D. V. Sarwate "Computation of cyclic redundancy checks via table look-up", Communications of the ACM, 31(8), pp. 1008–1013, 1988.

Some applications may rely on the very high probability that any change to the data will result in a change in the checksum, while others may take active steps to ensure that all changes will result in new checksums. This can be accomplished in the extremely unlikely case that an updated data set has the same checksum as the previous version by making an insignificant change to the data, such as adding a space at the end of a text file, and verifying that this perturbation affects the checksum.

When a message is to be sent from source 12, the URL, checksum and timestamp are provided in the transmitted message at 38 as a packet of data transmitted over network 10. When source 12 makes a data change, the fact of the change is transmitted to the recipient 14, which upon comparing timestamps and checksums can determine if a change has occurred. If so, the new version is requested at 40 such that web server 16 provides the new data to the recipient.

Figure 1B:
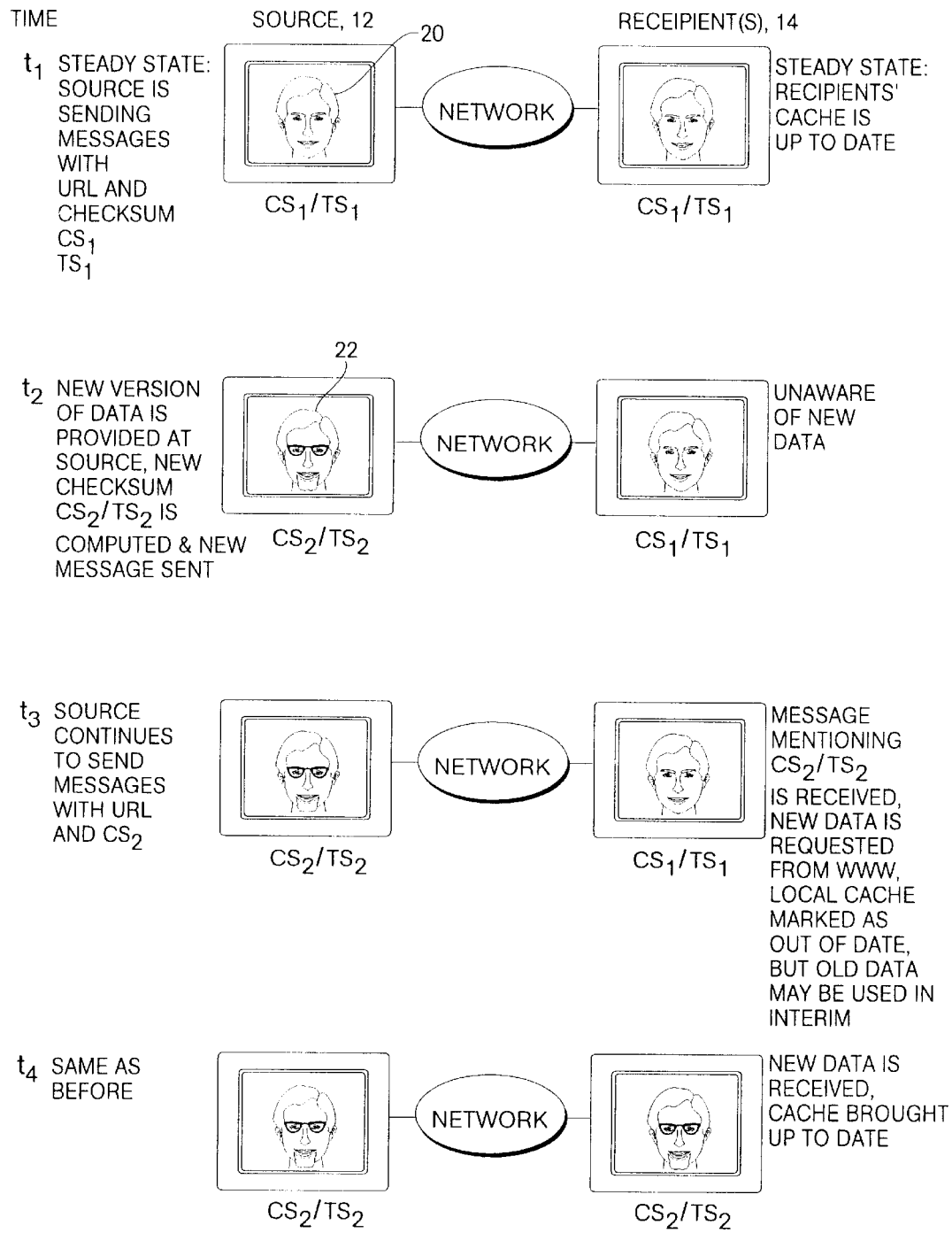
FIG. 1B is a diagrammatic representation of a scenario in which new data is provided at a source, with the source transmitting messages concerning the change in data to a recipient.

Referring now to FIG. 1B, how this is accomplished is as follows. As can be seen, at steady state, and at time $t_1$, the source 12 is sending messages with the corresponding URL, checksum and timestamp to recipient 14. This information is cached at the recipient site.

At time $t_2$, a new version of the data is provided at the source, with a new checksum and timestamp being computed. At this time the recipient is unaware of the new data.

At time $t_3$, the source continues to send messages with the corresponding URL and the new checksum/timestamp. At the recipient, the message mentioning the new checksum and timestamp is received, and the new data is requested from the World Wide Web, with the local cache having its data marked as out of date. It will be noted that the old data may be utilized in the interim, before the new data is fetched from the Web Server.

At time $t_4$, the new data is received, and the recipient's cache is brought up to date.

What will be appreciated is that the recipients can be made aware in a very efficient manner of the generation of new data for a given URL. This notification is transmitted in a small packet, not necessitating the transmission of the new data until requested by the recipients. This eliminates the necessity of transmitting large packets of data each time there is a data change. The system also eliminates the necessity for the recipients to periodically check whether the data they have stored has become obsolete. Further advantages of the subject system occur in a multicasting environment. For instance, since multicasting encourages the use of small packets, the subject system takes advantage of checksum/timestamp comparison system to provide notification of newly changed data to multicast users, at the same time allowing them to use more reliable means for obtaining the data itself. The subject system minimizes exposure to packet loss, because only small notification packets are sent via unreliable multicast network protocols. The sender may choose to issue redundant notification packets in order to improve the likelihood of their receipt.

Figure 2:
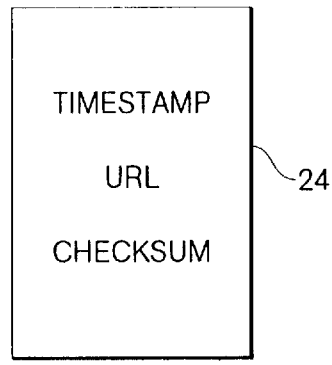
FIG. 2 is diagram of the data included in a network message, including timestamp, URL, and checksum.

More particularly, and referring now to FIG. 2, it will be appreciated that the network message 24 contains only the timestamp, URL, and the aforementioned checksum. This data format is sufficiently small so as to fit into a single UDP packet.

Figure 3:
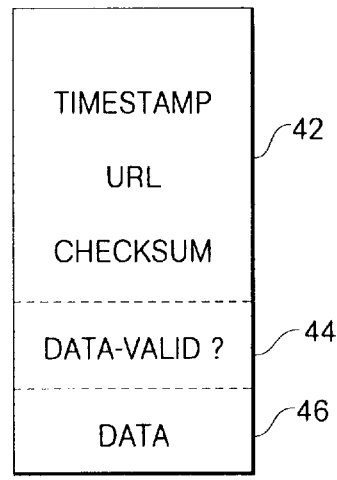
FIG. 3 is a diagram of the information stored by the recipient to enable determination of a data change affecting its cache.

Referring now to FIG. 3, the data which is cached at the recipient is cached as illustrated by the fields 42, 44 and 46, with the timestamp/URL/checksum residing in field 42, and with field 44 indicating valid data. Field 46 caches the current data.

Figure 4:
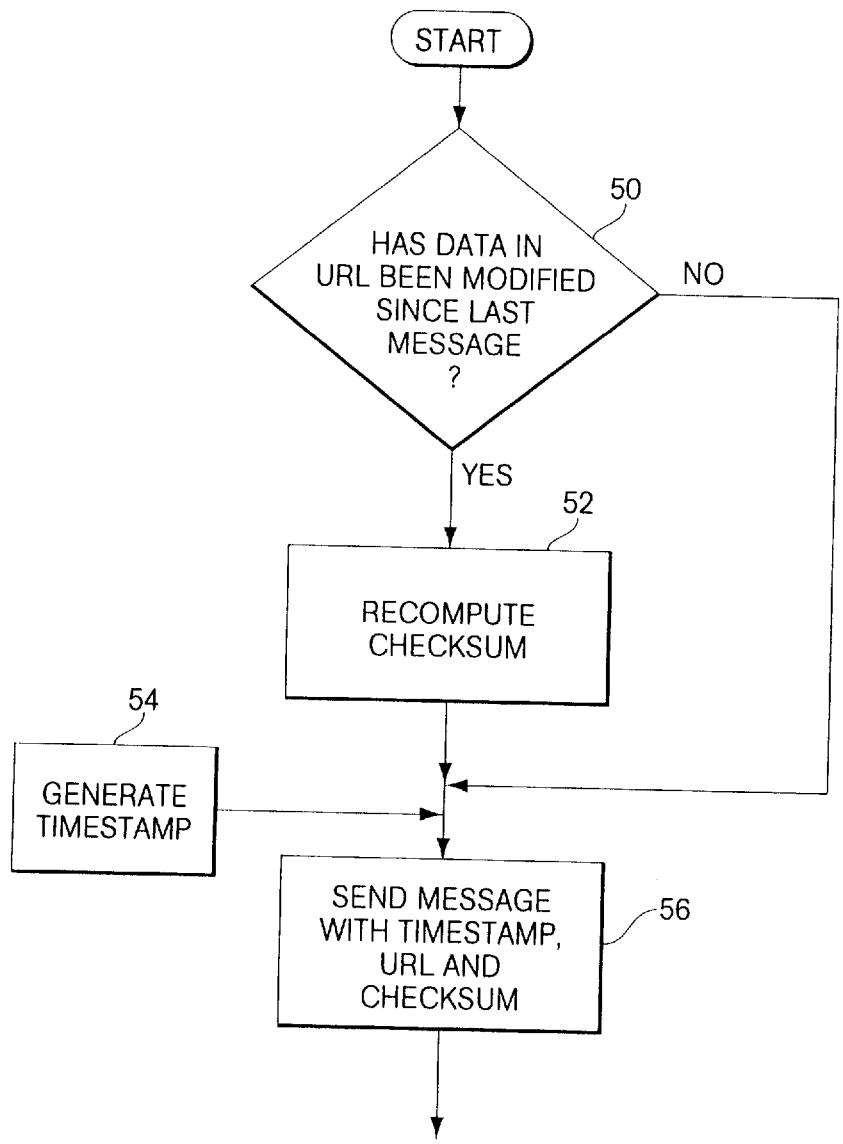
FIG. 4 is a flowchart indicating the process for sending a message with a timestamp, URL and checksum whenever the source desires to send any message about the data in that URL, including the recomputation of a checksum in response to data modification for the corresponding URL.

In operation, and referring now to FIG. 4, when source 14 is to send a message, the system determines at 50 whether data at the corresponding URL has been modified since the last message or is new. If so, the corresponding checksum is computed at 52. At 56, the URL and checksum are sent over the network with the corresponding timestamp generated at 54.

Figure 5:
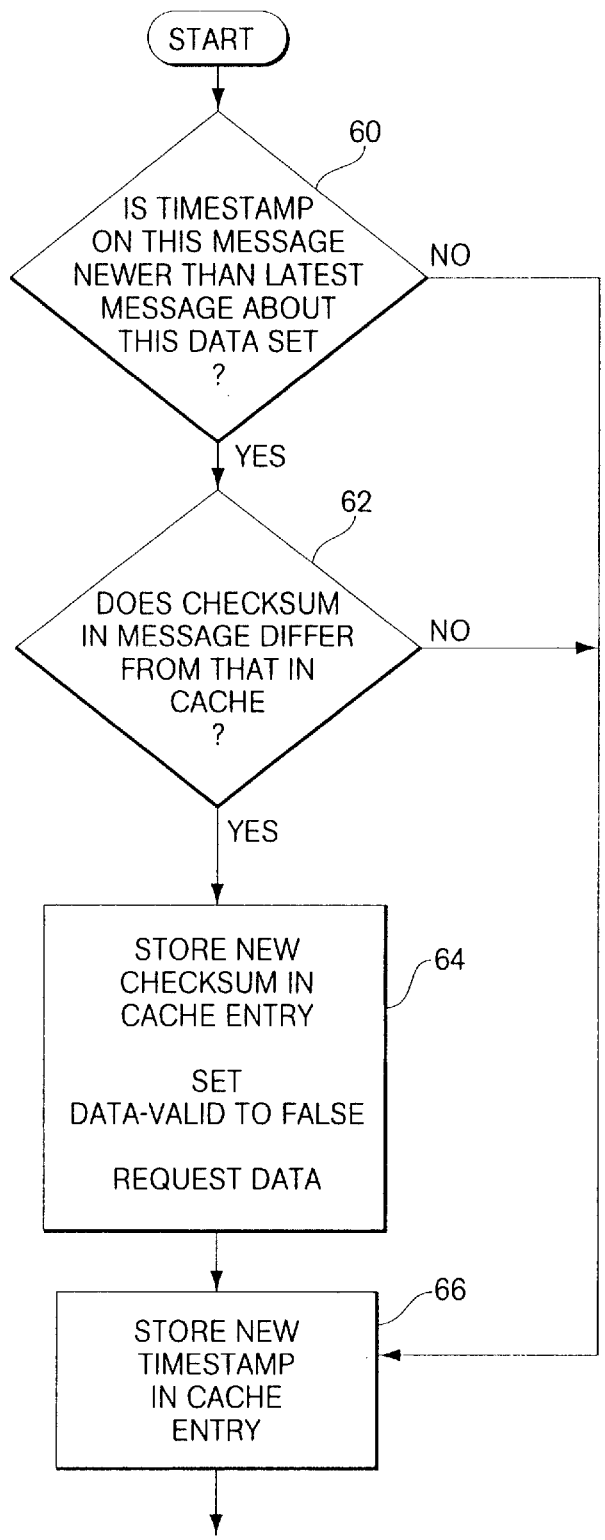
FIG. 5 is a flowchart of the process initiating upon receipt of a message sent by the process of FIG. 4 in which timestamps and checksums are evaluated for changes, followed by the request for the new data from the source, if needed; and, FIG. 6 is a flowchart describing the process following the receipt of new data in which a checksum is computed and compared with checksum in the cache entry to establish the validity of the new data.

Referring now to FIG. 5, upon receipt of the message generated by the process of FIG. 4, as illustrated at 60, the timestamp is evaluated to ascertain if it is newer than the latest current message received, if any, concerning the corresponding data set. If so, and as illustrated at 62, the checksum is compared with that of the message, if any, which has been cached to ascertain whether the data has changed or is new. Upon the ascertaining of a change, and as illustrated at 64, the new checksum replaces the old checksum in the cache entry, the data in the cache entry is marked as being no longer valid, and a request for the new data is generated. Thereafter, as illustrated at 66, the new timestamp received is stored locally in the cache entry.

Figure 6:
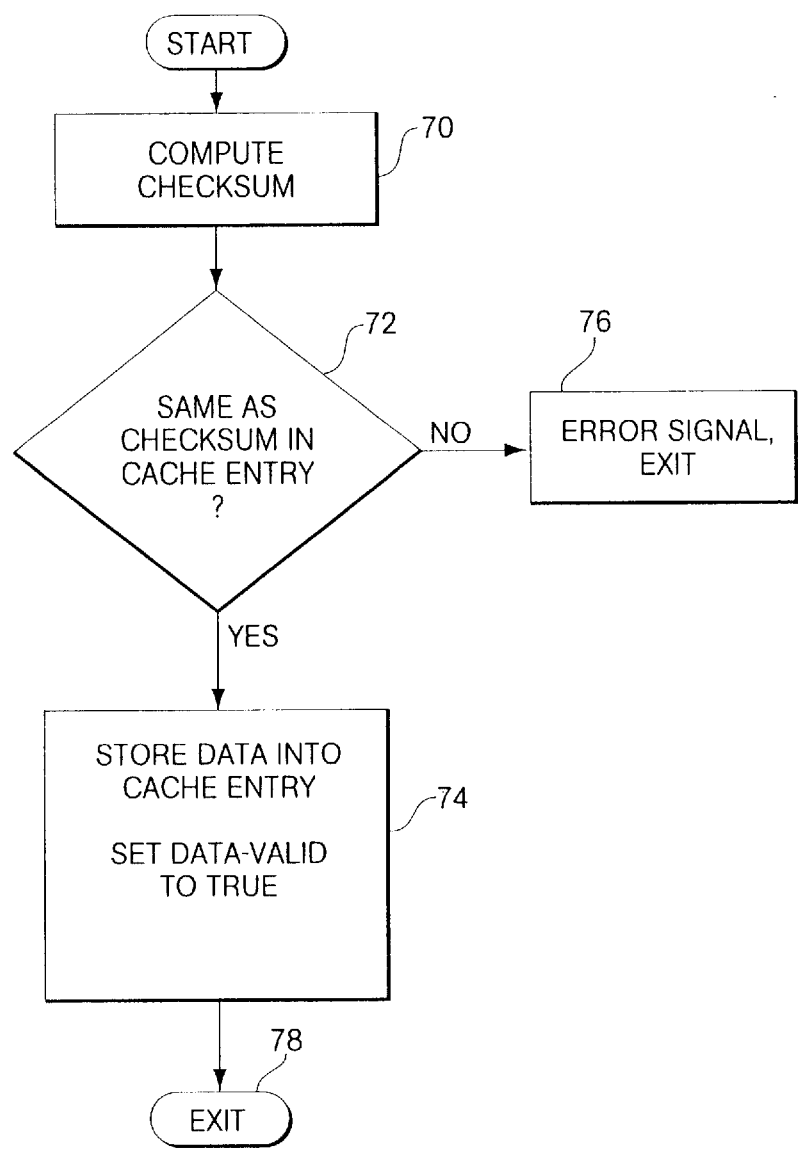

Referring now to FIG. 6, when the new data requested is received, its checksum is computed at 70 and is compared at 72 with the checksum in the cache entry. If it is the same as the checksum cached, then as illustrated at 74, new data is stored in the cache, with the DATA-VALID flag set to true. If there is a difference between the computed checksum and the checksum that has been cached, then an error signal is generated at 76 to effectuate an exit from this process.

Assuming that new valid data is cached, the process is completed as indicated by EXIT 78.

Subroutines for performing the indicated functions follow, with the code in ANSI C describing the operation of a scalable platform for interactive environments, called Spline.

at 54.

Referring now to Figure 5, upon receipt of the message generated by the process of Figure 4, as illustrated at 60, the timestamp is evaluated to ascertain if it is newer than the latest current message received, if any, concerning the corresponding data set. If so, and as illustrated at 62, the checksum is compared with that of the message, if any, which has been cached to ascertain whether the data has changed or is new. Upon the ascertaining of a change, and as illustrated at 64, the new checksum replaces the old checksum in the cache entry, the data in the cache entry is marked as being no longer valid, and a request for the new data is generated. Thereafter, as illustrated at 66, the new timestamp received is stored locally in the cache entry.

Referring now to Figure 6, when the new data requested is received, its checksum is computed at 70 and is compared at 72 with the checksum in the cache entry. If it is the same as the checksum cached, then as illustrated at 74, new data is stored in the cache, with the DATA-VALID flag set to true. If there is a difference between the computed checksum and the checksum that has been cached, then an error signal is generated at 76 to effectuate an exit from this process.

Assuming that new valid data is cached, the process is completed as indicated by EXIT 78.

Subroutines for performing the indicated functions follow, with the code in ANSI C describing the operation of a scalable platform for interactive environments, called Spline.

```
#include <stdlib.h>
#include <signal.h>
#include <stdio.h>
#include <errno.h>
#include <unistd.h>
#include <sys/types.h>
include <limits.h> include <sys/socket.h>
include <sys/file.h>
#include <netinet/in.h>
#include <net/if.h>
#include <netdb.h>
include <pwd.h> ifdef hpux
include <sys/fcntl.h>
#include <sys/ioctl.h>
#else /* sgi */
#include <fcntl.h>
#include <net/soioctl.h>
#include <bstring.h>
#include <sys/schedctl.h>
endif include <arpa/inet.h>
include <string.h>
```

- 13 -

```c
#include <spline.h>
#include <zdebug.h>
#include <spline/time.h>
#include <spline/network.h>
#include <spline/objdefs.h>
include <spline/share.h> ifdef hpux
define SO_REUSEPORT SO_REUSEADDR
endif static int fdcnt = 0;
extern int OBJ;
extern int LOOPAUDIO;
extern int testingSound;
extern void handleSourceActionMsg(spId speakerAction);
extern void checkClasses(void);

void networkAudit(void);

int LOCALE = 0;

#define DEFAULT_TTL 8 /* Time-to-live */
#define DEFAULT_SPLINE_PORT_BASE 8000
#define MAXLOCALES 40
define TOTALLOCALES 200 define DROP 0
define ADD 1
#define NEIGHBOR 0
define SELF 1 define BUFFERFULL -1 define OBJECT_CHANNELS 1
define AUDIO_STREAM 1
#define TEXT_STREAM 2
#define OBJECT_MASK 0x1
#define AUDIO_MASK 0x2
#define TEXT_MASK 0x4
define CHANNELS_PER_LOCALE 3 define Tch SPTAG
define ATch (SPAUDIO | SPTAG)
#define VTch (SPVISUAL | SPTAG)
#define AVTch (SPAUDIO | SPVISUAL | SPTAG)
#define TOch (SPTAG | SPOTHER)
#define ATOch (SPAUDIO | SPTAG| SPOTHER )
#define VTOch (SPVISUAL | SPTAG | SPOTHER)
#define AVTOch (SPAUDIO | SPVISUAL | SPTAG | SPOTHER)

short bits2bits[] = {
  TOch, ATch, VTch, AVTch, Tch, ATch, VTch, AVTch,
  TOch, ATOch, VTOch, AVTOch, TOch, ATOch, VTOch, AVTOch
};
int i2ch[] = {Tch, ATch, VTch, AVTch, TOch, ATOch, VTOch, AVTOch};
int bits2ch[] = {-1, -1, -1, -1, 0, 1, 2, 3, -1, -1, -1, -1, 4, 5, 6, 7};

typedef struct _localeList {
  spLocale lid;
  struct _localeList *next;
} localeList;

typedef struct {
  char *code;
  long packets;
```

```
  long bytes;
  TimeStamp timingtime;
  long timingbytes;
  TimeStamp smalltime;
  long smallbytes;
  long smallpeak;
} Statistics;

Statistics readStats[] =
  {{"rot"}, {"rt"}, {"rvt"}, {"rvto"}, {"rat"},
   {"rato"}, {"ravt"}, {"ravto"}, {"rsa"}, {"rst"}};
Statistics loopStats[] =
  {{"lot"}, {"lt"}, {"lvt"}, {"lvto"}, {"lat"},
   {"lato"}, {"lavt"}, {"lavto"}, {"lsa"}, {"lst"}};
Statistics unloopStats[] =
  {{"uot"}, {"ut"}, {"uvt"}, {"uvto"}, {"uat"},
   {"uato"}, {"uavt"}, {"uavto"}, {"usa"}, {"ust"}};
Statistics subspaceStatsIn = {"subspace-r"};
Statistics subspaceStatsOut = {"subspace-w"};

/* there's one of these for each locale being listened to */
typedef struct {
  spLocale lid;
  spId pov;
  int selfPOVCount[CHANNELS_PER_LOCALE];
  int totalPOVCount[CHANNELS_PER_LOCALE];
} LocaleInfo;

/* these arrays are kept in sync */
static LocaleInfo *locales[MAXLOCALES];
static struct pollfd objfds[MAXLOCALES];
static struct pollfd audiofds[MAXLOCALES];
static struct pollfd textfds[MAXLOCALES];
static int localecnt = 0;

/* there's one of these for each locale */
typedef struct {
  int index; /* index into array of locales being listened to */
  int loopOut; /* fd for looped output */
  int unloopOut; /* fd for unlooped output */
  TimeStamp lastsend; /* time of last networkSend() */
  int numNeighbors;
  struct LocaleNeighbor **neighbors;
} LocaleFD;

static LocaleFD lfd[TOTALLOCALES];

static int badversion = 0;

/* reused for every outgoing msg */
struct sockaddr_in outgoing;

static int ttl;
static unsigned baseaddr;
static unsigned subspaceaddr;
static struct pollfd subspacefd[1];
static int subspaceout;

u_short spBasePort = DEFAULT_SPLINE_PORT_BASE;

static int estimateTimeDelay(Message *msg);

/* callback functions set in spvisual.c */
void (*graphicsChangeLocaleHook)(spId, void *) = NULL;
void (*graphicsRemoveLocaleHook)(spLocale) = NULL;

int maxfd = 0;
```

```
#if 0
void siginput() {
  zprintf("input ");
}
endif

/* here will probably need to change */
static u_short subspacePort(void) {
  return spBasePort - 1;
} static u_short localePort(spLocale lid, int type) {
  int foo = (type < OBJECT_CHANNELS) ? 0 : 1;

return spBasePort + (u_short) (2*lid + foo);
} static unsigned localeAddr(spLocale lid, int type) {
  return (unsigned) (baseaddr + (lid << 8) + type);
}

/* channel on which to send msgs about id */
static int msgType(spId id) {
  if (subclass(getClass(id), spcSourceAction)) {
    return AUDIO_STREAM;
  }
  else {
#ifdef FILTER_BITS_WORKING
    return bits2ch[bits2bits[getFilterBits(id)]];
#else
    return 0;
#endif
  }
} boolean isSubspaceObj(spId id) {
  spId cid = getClass(id);

if (subclass(cid, spcMicrophone)) return TRUE;
  /* we don't want everyone, especially spaudio, to
     always have all of the speakers */
  if (subclass(cid, spcSpeaker)) return FALSE;
  if (subclass(cid, spcBeacon)) return TRUE;
  if (subclass(cid, spcLocaleLink)) return TRUE;
  return FALSE;
} spId localeOf(spId id) {
  spId p;

for (p=id; p; p=getParent(p)) {
    if (subclass(getClass(p), spcLocaleLink)) return p;
  }
  return NULL;
} spLocale localeIdOf(spId id) {
  if (id == NULL) return NOLOCALE;
  return getLocaleId(id);
} boolean myNeighbor(spLocale me, spLocale neighbor) {
  int n;

for (n=0; n<lfd[me].numNeighbors; n++) {
    if (lfd[me].neighbors[n]->localeId == neighbor) {
```

```
      return TRUE;
    }
  }
  return FALSE;
} spTMatrix *matrixFromTo(spLocale from, spLocale to) {
  int n;

for (n=0; n<lfd[from].numNeighbors; n++) {
    if (lfd[from].neighbors[n]->localeId == to) {
      return &(lfd[from].neighbors[n]->transform);
    }
  }
  return NULL;
} int MCopen(u_short port, boolean send, boolean wantloop, int ttl) {
  int fd;
  int on = 1;
  u_char loop = 0;
  u_char ttl_uc = ttl;
  struct in_addr ifaddr;

/* here is based on IRIX allowing 200 fd's per process */
  if (fdcnt > 125) {
    int i;
    int earliest = INT_MAX;
    int oneToClose = -1;

for (i=0; i<TOTALLOCALES; i++) {
        if ((lfd[i].loopOut || lfd[i].unloopOut)
    && lfd[i].lastsend < earliest) {
earliest = lfd[i].lastsend;
oneToClose = i;
      }
    }
    if (assert(oneToClose >= 0)) {
        ZZ(LOCALE) zprintf("Closing down locale 0x%x\n", oneToClose);
        if (lfd[oneToClose].loopOut) {
close(lfd[oneToClose].loopOut);
lfd[oneToClose].loopOut = 0;
fdcnt--;
      }
        if (lfd[oneToClose].unloopOut) {
close(lfd[oneToClose].unloopOut);
lfd[oneToClose].unloopOut = 0;
fdcnt--;
      }
    }
  } assert((fd = socket(AF_INET, SOCK_DGRAM, 0)) > 0);
  if (send) {
    zero(setsockopt(fd, IPPROTO_IP, IP_MULTICAST_TTL,
    &ttl_uc, sizeof(ttl_uc)));
    /*
     * Turn looping off if packets should not go back to the same host.
     * This means that multiple instances of this program will not
     * receive packets from each other.
     */
    if (!wantloop) {
      zero(setsockopt(fd, IPPROTO_IP, IP_MULTICAST_LOOP,
      &loop, sizeof(loop)));
    }
  }
  else { /* receive */
```

```
    struct sockaddr_in addr;

addr.sin_family = AF_INET;
    addr.sin_addr.s_addr = htonl(INADDR_ANY);
    addr.sin_port = htons(port);

/* use the default interface */
    ifaddr.s_addr = htonl(INADDR_ANY);

/*
     * Allow multiple instances of this program to listen on the same
     * port on the same host. By default, only 1 program can bind
     * to the port on a host.
     */
    zero(setsockopt(fd, SOL_SOCKET, SO_REUSEPORT, &on, sizeof(on)));
    zero(bind(fd, &addr, sizeof(struct sockaddr_in)));

#if 0
    signal(SIGIO, siginput);
    /* allow us to receive SIGIO signals for this fd */
    assert(fcntl(fd, F_SETOWN, getpid()) >= 0);
    /* turn on SIGIO signals for this fd */
    assert(fcntl(fd, F_SETFL, FASYNC) >= 0);
#endif
  }

/* non-blocking */
  assert(fcntl(fd, F_SETFL, FNDELAY) != -1);

fdcnt++;
  if (fd > maxfd) maxfd = fd;
  ZZZ(LOCALE) zprintf("%d %s on %d\n", fd,
      (send) ? "sending" : "receiving", port);
  return fd;
} void MCcreateaddress(struct sockaddr_in *address, unsigned group) {
  assert(IN_MULTICAST(group));
  bzero((char *) address, sizeof(struct sockaddr_in));
  address->sin_family = AF_INET;
  address->sin_addr.s_addr = htonl(group);
} struct sockaddr_in *MCsetaddr(struct sockaddr_in *address,
      unsigned group, u_short port) {
  assert(IN_MULTICAST(group));
  address->sin_addr.s_addr = htonl(group);
  address->sin_port = htons(port);
  return address;
} void MCjoin(int fd, unsigned group) {
  struct ip_mreq mreq;
  struct in_addr ifaddr;
  struct in_addr grpaddr;

grpaddr.s_addr = htonl(group);
  assert(IN_MULTICAST(grpaddr.s_addr));
  ifaddr.s_addr = htonl(INADDR_ANY);
  mreq.imr_multiaddr = grpaddr;
  mreq.imr_interface = ifaddr;
  zero(setsockopt(fd, IPPROTO_IP, IP_ADD_MEMBERSHIP,
      &mreq, sizeof(mreq)));
  ZZZ(LOCALE) zprintf("%d joining %08x\n", fd, group);
} void MCleave(int fd, unsigned group) {
```

```
  struct ip_mreq mreq;
  struct in_addr ifaddr;
  struct in_addr grpaddr;

grpaddr.s_addr = htonl(group);
  assert(IN_MULTICAST(grpaddr.s_addr));
  ifaddr.s_addr = htonl(INADDR_ANY);
  mreq.imr_multiaddr = grpaddr;
  mreq.imr_interface = ifaddr;
  zero(setsockopt(fd, IPPROTO_IP, IP_DROP_MEMBERSHIP,
  &mreq, sizeof(mreq)));
  ZZZ(LOCALE) zprintf("%d leaving %08x\n", fd, group);
} static void initStats(Statistics *stats) {
  stats->packets = stats->bytes = stats->timingbytes =
    stats->smallbytes = stats->smallpeak = 0;
  stats->timingtime = stats->smalltime = GetT();
} define SMALLTIME 50 /* msec */
define RATE(stats, sbytes, stime) ((8*1000*((stats)->bytes - sbytes)/(now - st
static void doStats(Statistics *stats, Message *msg) {
  if (stats == NULL) return;
  stats->packets++;
  stats->bytes += msg->MsgLength;
  ZZ(NET) {
    TimeStamp now = GetT();

if (now - stats->smalltime > SMALLTIME) {
      long load = RATE(stats, stats->smallbytes, stats->smalltime);

if (load > stats->smallpeak) stats->smallpeak = load;
      stats->smallbytes = stats->bytes;
      stats->smalltime = now;
    }
    if (now - stats->timingtime > 1000) {
      zprintf("%s %d packets, %dk bits/sec average, %dk bits/sec peak\n",
        stats->code, stats->packets, RATE(stats, stats->timingbytes,
         stats->timingtime), stats->smallpeak);
      stats->packets = 0;
      stats->timingbytes = stats->bytes;
      stats->timingtime = now;
      stats->smallpeak = 0;
    }
  }
  ZZZZ(NET) {
    printf("%s%d ", stats->code, msg->MsgLength);
    fflush(stdout);
  }
}
undef RATE void MCwrite(int fd, struct sockaddr_in *address, Message *msg) {
  if (!assert(address != NULL && msg != NULL)) {
    zwarn("Can't write, null argument(s)\n");
    return;
  }
  if (thisproc->fakePartner) toggleNames((spId)msg);
  assert(msg->MsgLength<LONGESTMSG);
  assert(sendto(fd, (char *)msg, msg->MsgLength, 0,
address, sizeof(struct sockaddr_in)) >= 0);
  /* must be sure to fix them up too. */
  if (thisproc->fakePartner) toggleNames((spId)msg);
} static char msgtodrop[LONGESTMSG];
```

```c
int MCread(int fd, char *message, int len) {
  int cnt;

if (message == NULL) {
    message = msgtodrop;
    len = sizeof(msgtodrop);
    ZZ(NET) zprintf("Dropping msg.\n");
  }
  assert((cnt = recv(fd, message, len, 0)) >= 0);
  return (message == msgtodrop) ? BUFFERFULL : cnt;
} static boolean localeInWM(spId locale, void *locinfo) {
  LocaleInfo *loc = (LocaleInfo *) locinfo;

if (getLocaleId(locale) == loc->lid) {
    informNetworkLocaleIsReady(loc->lid, locale);
    return TRUE;
  }
  return FALSE;
}

/* this adds a locale to the list of locales that are
    being listened to */
static void addLocale(spLocale lid) {
  LocaleInfo *loc;
  long i;

if (lid == NOLOCALE) return;
  if (lfd[lid].index >= 0) {
    /* locale already in table */
    return;
  }
  if (localecnt == MAXLOCALES) {
    zwarn("Locale space is full; ignoring new locale %d\n", lid);
    return;
  }
  lfd[lid].index = localecnt++;
  loc = locales[lfd[lid].index];
  Z(LOCALE) zprintf("Creating locale 0x%x in slot %d\n", lid, lfd[lid].index);
  assert(lid >= 0 && lid <= 255);
  loc->lid = lid;
  loc->pov = NULL;
  for (i=0; i<CHANNELS_PER_LOCALE; i++) {
    loc->selfPOVCount[i] = loc->totalPOVCount[i] = 0;
  }
  spExamineWorldModel(spcLocaleLink, localeInWM, (void *)loc);
  return;
} static int findLocale(spLocale lid) {
  if (lid == NOLOCALE) return -1;
  addLocale(lid);
  return lfd[lid].index;
} static void removeLocale(long i) {
  LocaleInfo *loc = locales[i];

Z(LOCALE) zprintf("Removing locale 0x%x\n", loc->lid);
  lfd[loc->lid].index = -1;

if (graphicsRemoveLocaleHook != NULL)
    graphicsRemoveLocaleHook(loc->lid);

if (loc->pov) {
    setParent(loc->pov, NULL);
```

```
    }
    localecnt--;
    if (objfds[i].fd) {
      close(objfds[i].fd);
      fdcnt--;
    }
    objfds[i].fd = objfds[localecnt].fd;
    objfds[localecnt].fd = 0;

if (audiofds[i].fd) {
      close(audiofds[i].fd);
      fdcnt--;
    }
    audiofds[i].fd = audiofds[localecnt].fd;
    audiofds[localecnt].fd = 0;

if (textfds[i].fd) {
      close(textfds[i].fd);
      fdcnt--;
    }
    textfds[i].fd = textfds[localecnt].fd;
    textfds[localecnt].fd = 0;

if (i < localecnt) {
      locales[i] = locales[localecnt];
      locales[localecnt] = loc;
      lfd[locales[i]->lid].index = i;
    }
  }
} static void modifyChannel(int lindex, int type, boolean add, boolean self) {
  struct pollfd *fds;
  LocaleInfo *loc;

if (lindex == -1) return;
  loc = locales[lindex];
  assert(type >= 0);
  if (type < OBJECT_CHANNELS) {
    fds = objfds;
  }
  else if (type == AUDIO_STREAM) {
    fds = audiofds;
  }
  else if (type == TEXT_STREAM) {
    fds = textfds;
  }
  else {
    zwarn("Bad type.\n");
    return;
  } if (add) {
    if (self) loc->selfPOVCount[type]++;
    if (loc->totalPOVCount[type]++ == 0) {
      if (fds[lindex].fd == 0) {
fds[lindex].fd = MCopen(localePort(loc->lid, type), FALSE, FALSE, ttl);
fds[lindex].events = POLLIN;
      }
      MCjoin(fds[lindex].fd, localeAddr(loc->lid, type));
    }
  }
  else {
    if (self) loc->selfPOVCount[type]--;
    if (--loc->totalPOVCount[type] == 0) {
      MCleave(fds[lindex].fd, localeAddr(loc->lid, type));
```

```c
      }
    }
    ZZZ(LOCALE) zprintf("%s %s count(%d/%d), type %d, "
        "locale 0x%x\n",
        (add) ? "+" : "-",
        (self) ? "self" : "neighbor",
        loc->selfPOVCount[type], loc->totalPOVCount[type],
        type, loc->lid);
    if (!assert(loc->selfPOVCount[type] >= 0)) {
      loc->selfPOVCount[type] = 0;
    }
    if (!assert(loc->totalPOVCount[type] >= 0)) {
      loc->totalPOVCount[type] = 0;
    }
} static void considerRemoval(void) {
  int lindex = 0;

while (lindex < localecnt) {
    LocaleInfo *loc = locales[lindex];
    int i;
    boolean toss = TRUE;

for (i=0; toss && i<CHANNELS_PER_LOCALE; i++) {
      if (loc->totalPOVCount[i]) toss = FALSE;
    }
    if (toss) removeLocale(lindex); /* decrements localecnt */
    else lindex++;
  }
}

/* add or drop the type channel from all the neighbors of locale */
static void modifyNeighbors(spLocale lid, int type, boolean add) {
  int n;

for (n=0; n<lfd[lid].numNeighbors; n++) {
    modifyChannel(findLocale(lfd[lid].neighbors[n]->localeId),
    type, add, NEIGHBOR);
  }
}

/* in all neighbors of the locale, add whatever channels this
   locale is listening to */
static void addNeighbors(spLocale lid) {
  int n;
  int type;
  int lindex = lfd[lid].index;
  LocaleInfo *loc = locales[lindex];

assert(lindex != -1);
  for (n=0; n<lfd[lid].numNeighbors; n++) {
    for (type=0; type<CHANNELS_PER_LOCALE; type++) {
      if (loc->selfPOVCount[type] > 0) {
modifyChannel(findLocale(lfd[lid].neighbors[n]->localeId),
        type, ADD, NEIGHBOR);
      }
    }
  }
}

/* Called when a locale enters the world model
   and when a locale is added to the list of active locales.
   Starts listening in the neighbors, as needed. */
void informNetworkLocaleIsReady(spLocale localeId, spId id) {
  int lindex;
```

```
  /* locale already known to us */
  if (lfd[localeId].numNeighbors != 0) return;

lfd[localeId].numNeighbors = getLocaleNumNeighbors(id);
  lfd[localeId].neighbors = (struct LocaleNeighbor **)getLinkData(id);

lindex = lfd[localeId].index;
  if (lindex == -1) return;
  /* we are listening, so consider adding in neighbors */
  addNeighbors(localeId);
  if (locales[lindex]->pov && getParent(locales[lindex]->pov) == NULL) {
    setParent(locales[lindex]->pov, id);
  }
}

/* send out a spId */
void networkSend(spId id) {
  int chan = msgType(id);
  unsigned addr;
  u_short port;
  int fd;
  Statistics *stats;
  int lid = getLocaleId(id);

considerRemoval();
  if (lid == NOLOCALE) return;

if (isSubspaceObj(id)) {
    addr = subspaceaddr;
    port = subspacePort();
    fd = subspaceout;
    stats = &subspaceStatsOut;
  }
  else {
    addr = localeAddr(lid, chan);
    port = localePort(lid, chan);
    lfd[lid].lastsend = thisproc->wm->wmtime;
    /* here looping should be determined by the caller */
    if (chan == AUDIO_STREAM && !ZTEST(LOOPAUDIO, 1)) {
       if (lfd[lid].unloopOut == 0) {
lfd[lid].unloopOut = MCopen(port, TRUE, FALSE, ttl);
       }
       fd = lfd[lid].unloopOut;
       stats = &unloopStats[chan];
    }
    else {
       if (lfd[lid].loopOut == 0) {
lfd[lid].loopOut = MCopen(port, TRUE, TRUE, ttl);
       }
       fd = lfd[lid].loopOut;
       stats = &loopStats[chan];
    }
  } setMsgSendTime(id, GetT());
  if (getMsgNeeded(id)) {
    setTimeOfUpdate(id, thisproc->wm->wmtime);
    setMessagesSinceUpdate(id, 1);
  }
  else {
    setMessagesSinceUpdate(id, getMessagesSinceUpdate(id)+1);
  }
  if (subclass(getClass(id), spcBeacon)) {
    setBeaconLocaleId(id, localeIdOf(id));
    /* here is a hack */
    setBeaconMulticastPort(id, addr & 0xfffffff0);
  }
```

- 23 -

```
  ZZZ(OBJ) zprintf("sending obj (0x%08x-%s) to %08x/%d\n",
    id, getClassName(getClass(id)), addr, port);
  setMsgAddr(id, addr);
  MCwrite(fd, MCsetaddr(&outgoing, addr, port), (Message *)id);
  doStats(stats, (Message *)id);
  ZZZ(NET) zprintf("sent obj (0x%08x-%s) to %08x/%d\n",
    id, getClassName(getClass(id)), addr, port);
} static int typeFromAddr(unsigned addr) {
  /* here temporary */
  return (addr & 0xf);
} define MAXLOST 100
struct lostmsg {
  unsigned addr;
  unsigned sender;
  int count;
  int type;
} lostmsgs[MAXLOST];
int lostcnt = 0;

static void reportlost(void) {
  static unsigned lastwarning = 0;
  spDuration d = TDelta(thisproc->wm->wmtime, lastwarning);
  uid_t uid;
  struct passwd *pwd;
  struct in_addr address;
  struct hostent *host;
  struct lostmsg *lost;
  int i;

/* for each source of wayward msgs, give one warning per minute */
  if (d < 0 || d > 60000) {
    if (badversion > 0) {
      zprintf("Rejected %d packets with wrong version number.\n", badversion);
      badversion = 0;
    }
    lastwarning = thisproc->wm->wmtime;
    for (i=0; i<lostcnt; i++) {
      lost = &lostmsgs[i];
      if (lost->count > 0) {
uid = (lost->addr>>16) - (225<<8);
pwd = getpwuid(uid);
address.s_addr = htonl(lost->sender);
host = gethostbyaddr(&address, sizeof(struct in_addr), AF_INET);
errno = 0;
zprintf("Ignored %d type#%d msg(s) from locale%d.%s@%s\n",
        lost->count, lost->type, (lost->addr&0xff00)>>8,
        (pwd) ? pwd->pw_name : "unknown",
        (host) ? host->h_name : "unknown");
lost->count = 0;
      }
    }
  }
} static void networkReceive(Message *msg, LocaleInfo *loc) {
  unsigned addr = msg->MsgAddr;
  int type = typeFromAddr(addr);
  boolean found = FALSE;
  struct lostmsg *lost;
  int i;

if (msg->MsgCode != SPLINEVERSION) {
    badversion++;
```

```
    }
    else if (addr == subspaceaddr) {
      estimateTimeDelay(msg);
      doStats(&subspaceStatsIn, msg);
      processObjMsg(msg);
      Z(OBJ) checkClasses();
      Z(LOCALE) networkAudit();
    }
    else if ((addr & 0xffff0000) != baseaddr || loc == NULL
      || loc->totalPOVCount[type] == 0) {
      for (i=0; i<lostcnt; i++) {
        lost = &lostmsgs[i];
        if (addr == lost->addr && msg->MsgSender == lost->sender) {
found = TRUE;
lost->count++;
break;
        }
      }
      if (!found) {
        if (lostcnt < MAXLOST-1) {
lost = &lostmsgs[lostcnt++];
lost->type = type;
lost->addr = addr;
lost->sender = msg->MsgSender;
lost->count = 0;
        }
      }
    }
    else {
      if (type >= 0 && type < OBJECT_CHANNELS) {
        estimateTimeDelay(msg);
        doStats(&readStats[type], msg);
        processObjMsg(msg);
        Z(OBJ) checkClasses();
        Z(LOCALE) networkAudit();
      }
      /* Here this is not really right, because msgs may be very old */
      else if (type == AUDIO_STREAM) {
        /* if doing some internal testing, leave times alone! */
        if (!testingSound) estimateTimeDelay(msg);
        doStats(&readStats[type], msg);
        handleSourceActionMsg((spId) msg);
      }
      else {
        zwarn("Can't deliver msg to 0x%08x\n", addr);
      }
    }
    Z(NET) reportlost();
} typedef unsigned *usp;
static int processMsgs(struct pollfd *fds, int fdcnt, int max) {
  int cnt;
  long lindex;
  char msg[LONGESTMSG];
  int n = 0;

do {
    if (!assert((cnt = poll(fds, fdcnt, 0)) >= 0)) {
      zwarn("poll returned %d\n", fds[0].revents);
    }
    if (cnt > 0) {
      for (lindex=0; lindex<fdcnt; lindex++) {
if (fds[lindex].fd != 0 && fds[lindex].revents & POLLIN) {
  if (MCread(fds[lindex].fd, msg, LONGESTMSG) > 0) {
    networkReceive((Message *)msg, locales[lindex]);
    n++;
```

```
      if (max > 0 && n >= max) return n;
    }
  }
        }
      }
  } while (cnt > 0);
  return n;
} static int max = 100;

void processIncomingMsgs(void) {
  int n, s;
  static int in_a_row = 0;

n = processMsgs(objfds, localecnt, max);
  if (subspacefd[0].fd > 0)
    s = processMsgs(subspacefd, 1, max);
  else s = 0;
  ZZZZ(LOCALE) if (n+s > 0) zprintf("%d/%d msgs processed\n", n, s);
  /* try to smooth out message receipt so big waves of msgs
     get spread over several frames, but if we just aren't getting
     them all after 6 frames, process them all */
  if (n == max || s == max) {
    if (++in_a_row > 1) {
      n = processMsgs(objfds, localecnt, 0);
      s = processMsgs(subspacefd, 1, 0);
      in_a_row = 0;
      max += 2;
      Z(NET) zprintf("Bumping max msgs per frame to %d (%d + %d left over)\n",
      max, n, s);
    }
  } else in_a_row = 0;
}

/* This processes any pending sound messages.  It adds in extra
   latency to wait until you need the data before processing any
   messages, but it means we do not have to have a separate thread.
   We will do something better later.*/ void processPendingSoundMsgs(void) {
  processMsgs(audiofds, localecnt, 0);
} short bits2chan(short bits) {
  int i;
  short chan = 0;

zero(bits & ~0xf);
  /* these bits must be on */
  bits = bits2bits[bits & 0xf];
  for (i=0; i<OBJECT_CHANNELS; i++) {
    int channel = i2ch[i];
    if (channel & bits == channel) chan |= (1 << i);
  }
  /* here we temporarily turn them all on until the tag bits are correct */
#ifndef FILTER_BITS_WORKING
  chan = 1;
#endif
  return chan;
} static boolean parentPOV(spId locale, void *data) {
  LocaleInfo *loc = (LocaleInfo *) data;

if (getLocaleId(locale) == loc->lid) {
    setParent(loc->pov, locale);
```

```
      return TRUE;
    }
    return FALSE;
} static void modifyListener(spId pov, short newbits,
    spLocale locale, boolean new) {
  int lindex;
  short oldbits;
  short changes;
  int i;
  LocaleInfo *loc;

if (checkId(pov, spcBeacon, FALSE)) return;
  if (locale == NOLOCALE) locale = localeIdOf(pov);
  lindex = findLocale(locale);
  if (lindex < 0) {
    zwarn("Trying to listen to nothing.\n");
    return;
  }
  loc = locales[lindex];
  if (loc->pov == NULL) {
    loc->pov = spMake(spcPOV);
    setBeaconPort(loc->pov, -1);
    setLocaleId(loc->pov, NOLOCALE);
  }
  if (getParent(loc->pov) == NULL) {
    spExamineWorldModel(spcLocaleLink, parentPOV, loc);
  } oldbits = (new) ? 0 : getListeningBits(pov);
  changes = oldbits ^ newbits;
  setListeningBits(pov, newbits);

if (lindex != -1) {
    for (i=0; i<CHANNELS_PER_LOCALE; i++) {
      if (changes & (1 << i)) {
modifyChannel(lindex, i, newbits & (1 << i), SELF);
modifyNeighbors(loc->lid, i, newbits & (1 << i));
      }
    }
  }
}

/* here listen really should check if this pov has a parent
   that is a pov owned by another process, and listen on
   that pov as well. Furthermore, whenever a parent is set,
   we need to test if this condition is either being
   created or removed and either listen or stop listening
   on that other pov. */ void spListen(spId pov) {
  modifyListener(pov,
  bits2chan(getTagFilterBits(pov))
  | (getListeningBits(pov) & (AUDIO_MASK | TEXT_MASK)),
  NOLOCALE, FALSE);
} void spStopListening(spId pov) {
  modifyListener(pov, getListeningBits(pov) & (AUDIO_MASK | TEXT_MASK),
  NOLOCALE, FALSE);
} void spListenForAudioStreams(spId pov) {
  modifyListener(pov, getListeningBits(pov) | AUDIO_MASK, NOLOCALE, FALSE);
}
```

```
void stopAudioStreams(spId pov) {
  modifyListener(pov, getListeningBits(pov) & ~AUDIO_MASK, NOLOCALE, FALSE);
} void spListenForTextStreams(spId pov) {
  modifyListener(pov, getListeningBits(pov) | TEXT_MASK, NOLOCALE, FALSE);
} void stopTextStreams(spId pov) {
  modifyListener(pov, getListeningBits(pov) & ~TEXT_MASK, NOLOCALE, FALSE);
} void stopAllListening(spId pov) {
  if (getListeningBits(pov) && OBJECT_MASK) spStopListening(pov);
  if (getListeningBits(pov) && AUDIO_MASK) stopAudioStreams(pov);
  if (getListeningBits(pov) && TEXT_MASK) stopTextStreams(pov);
} static void openSubspace(unsigned int hostnum) {
  if (subspacefd[0].fd <= 0) {
    subspacefd[0].fd = MCopen(subspacePort(), FALSE, FALSE, ttl);
    subspacefd[0].events = POLLIN;
    MCjoin(subspacefd[0].fd, subspaceaddr);
  }
} void spListenForBeacon(spId beacon) {
  openSubspace(getBeaconHost(beacon));
  return;
} void spListenForBeacons(spHost hostNum) {
  openSubspace(hostNum);
  return;
} int self[TOTALLOCALES][CHANNELS_PER_LOCALE];
int total[TOTALLOCALES][CHANNELS_PER_LOCALE];

static boolean computeCount(spId pov, void *ignore) {
  int listening = getListeningBits(pov);
  spLocale lid;
  int n, type;

if (listening) {
    for (type=0; type<CHANNELS_PER_LOCALE; type++) {
      if (listening & (1 << type)) {
  lid = localeIdOf(pov);
  if (lid != NOLOCALE) {
    self[lid][type]++;
    total[lid][type]++;
    for (n=0; n<lfd[lid].numNeighbors; n++) {
      total[lfd[lid].neighbors[n]->localeId][type]++;
    }
  }
      }
    }
  }
  return FALSE;
} void networkAudit(void) {
  int count = 0;
  int i, type;

for (i=0; i<TOTALLOCALES; i++) {
    for (type=0; type<CHANNELS_PER_LOCALE; type++) {
```

```
      self[i][type] = total[i][type] = 0;
    }
  } spExamineWorldModel(spcPOV, computeCount, NULL);

for (i=0; i<TOTALLOCALES; i++) {
    int any = 0;
    int counted = 0;

for (type=0; type<CHANNELS_PER_LOCALE; type++) {
      if (self[i][type]) {
assert(lfd[i].index != NOLOCALE);
assert(self[i][type] == locales[lfd[i].index]->selfPOVCount[type]);
any++;
      }
      if (total[i][type]) {
assert(lfd[i].index != NOLOCALE);
assert(total[i][type] == locales[lfd[i].index]->totalPOVCount[type]);
any++;
if (!counted) {
  count++;
  counted++;
}
      }
    }
    if (!any) {
      for (type=0; type<CHANNELS_PER_LOCALE; type++) {
if (lfd[i].index != NOLOCALE) {
  assert(locales[lfd[i].index]->selfPOVCount[type] == 0);
  assert(locales[lfd[i].index]->totalPOVCount[type] == 0);
}
      }
    }
    if (lfd[i].index == -1) {
       assert(!any);
    }
    else {
       if (lfd[i].index < localecnt) {
assert(locales[lfd[i].index]->lid == i);
       }
    }
  }
  assert(count == localecnt);

for (i=0; i<localecnt; i++) {
    if (locales[i]->pov) {
       assert((getParent(locales[i]->pov) == NULL) ||
         getLocaleId(locales[i]->pov) ==  locales[i]->lid);
    }
  }
} spLocale lookingfor = -2;

static void incUnsatisfied(spLocale lid) {
  if (lookingfor == -2) lookingfor = lid;
  else {
    if (lid != lookingfor) lookingfor = -1;
  }
  if (thisproc->wm->oldestUnsatisfied == 0) {
    thisproc->wm->oldestUnsatisfied = thisproc->wm->wmtime;
  }
  thisproc->wm->newestUnsatisfied = thisproc->wm->wmtime;
}

/* find if we have the locale, or any of its neighbors */
```

```
static boolean dopov(spId locale, void *data) {
  spLocale newlid = (spLocale) data;
  int lid = getLocaleId(locale);

if (lid == newlid) {
    /* this process has information about that locale */
    incUnsatisfied(newlid);
    return TRUE;
  }
  else {
    int nn = getLocaleNumNeighbors(locale);
    struct LocaleNeighbor **N = (struct LocaleNeighbor **)getLinkData(locale);
    int n;

for (n=0; n<nn; n++) {
       if (N[n]->localeId == newlid) {
incUnsatisfied(newlid);
return FALSE;
      }
     }
  }
  return FALSE;
}

/* This is called when POVs from other processes change their locale.
   We are responsible for sending any objects we have that are
   in that locale or its neighbors. */
extern void POVEnteringFrom(spLocale newlid, spLocale oldlid) {
  /* the POV is lost; we should broadcast now */
  if (newlid == NOLOCALE) {
    incUnsatisfied(newlid);
    return;
  }
  /* we are listening in that locale; assume we have something */
  if (lfd[newlid].index != NOLOCALE) {
    incUnsatisfied(newlid);
    return;
  } spExamineWorldModel(spcLocaleLink, dopov, (void *) newlid);
}

/* If this pov is a descendant of an object changing locales,
   then we need to stop listening wherever it was listening,
   and start listening wherever it is moving to. */
boolean relocatePOV(spId pov, void *reparent) {
  int listening = getListeningBits(pov);
  struct reparent *reloc = (struct reparent *)reparent;
  extern boolean spDescendant(spId child, spId parent);
  boolean shouldconsider = FALSE;

if (spDescendant(pov, reloc->child)) {
     if (listening) {
        if (reloc->oldl != NOLOCALE) {
/* stop listening through this pov in the old locale */
modifyListener(pov, 0, reloc->oldl, FALSE);
shouldconsider = TRUE;
        }
        if (reloc->newl != NOLOCALE) {
/* add the effect of listening through this pov
   to the new locale */
modifyListener(pov, listening, reloc->newl, TRUE);
        }
     }
     /* tell the graphics to switch models */
     if (graphicsChangeLocaleHook != NULL) {
        graphicsChangeLocaleHook(pov, reloc);
```

```
      }
      /* May be able to gc some old locales.
         We waited because the new locale probably neighbors many
         of the same locales, and we don't want to thrash them
         in and out. */
      if (shouldconsider) considerRemoval();
   }
   return FALSE;
}

/* If present, SPLINEADDRESS is used as the multicast base address.
   Else SPLINENAME (must be a userid) is used to compute it.
   */
void networkInit() {
   char *address = getenv("SPLINEADDRESS");
   char *name = getenv("SPLINENAME");
   char *ttls = getenv("SPLINETTL");
   char *portstr = getenv("SPLINEPORT");
   char group[32];
   uid_t uid = 0;
   long i;

assert(LOCALE = zregister("locale", "locale"));

if (portstr != NULL) {
      spBasePort = (u_short) atoi(portstr);
   }
   if (address != NULL) strcpy(group, address);
   else {
      if (name == NULL) uid = getuid();
      else {
         struct passwd *pwd = getpwnam(name);

if (pwd) uid = pwd->pw_uid;
         else {
   zwarn("Bad SPLINENAME: %s, using session 0.\n", name);
         }
      }
      sprintf(group, "%ld.%ld.0.0", 225+((uid & 0xff00) >> 8), uid & 0xff);
   }
   baseaddr = inet_addr(group);
   Z(NET) zprintf("Network base address is 0x%08x\n", baseaddr);
   assert((baseaddr & 0xffff) == 0);
   assert(IN_MULTICAST(baseaddr));
   ttl = (ttls == NULL) ? DEFAULT_TTL : atoi(ttls);

subspacefd[0].fd = 0;
   subspaceout = MCopen(subspacePort(), TRUE, TRUE, ttl);
   for (i=0; i<MAXLOCALES; i++) {
      locales[i] = (LocaleInfo *)malloc(sizeof(LocaleInfo));
      objfds[i].fd = audiofds[i].fd = textfds[i].fd = 0;
   } for (i=0; i<TOTALLOCALES; i++) {
      lfd[i].index = -1;
      lfd[i].loopOut = 0;
      lfd[i].unloopOut = 0;
   } for (i=0; i<CHANNELS_PER_LOCALE; i++) {
      initStats(&readStats[i]);
      initStats(&loopStats[i]);
      initStats(&unloopStats[i]);
   } thisproc->wm->oldestUnsatisfied = 0;
```

```
  subspaceaddr = baseaddr | 0xffff;
  /* the actual address will be filled in later */
  MCcreateaddress(&outgoing, subspaceaddr);

/* force everyone to listen */
  spListenForBeacons(spDisplayHost());
}

/* T I M I N G */ define MAXSPLINES 20 struct NetDelayInfo {
  long int sender;
  DelayInfo delayInfo;
};

struct NetDelayInfo netDelays[MAXSPLINES];
int netDelaysIndex = 0;

DelayInfo * netDelayOf(long sender) {
  int i;
  for (i=0; i<netDelaysIndex; i++) {
    if (netDelays[i].sender == sender) return &netDelays[i].delayInfo;
  }
  return NULL;
}

/* This is used to shift all the times in an object to adjust them to
   take account of message transit times and clock differences between
   machines.  Note this decoding operation is not idempotent.  You must
   be careful not to call it twice on the same message. */

/* here these two could be unified more cleanly */ int shiftAllTimes(Message *id, TimeStamp delta) {
  int i;
  TimeStamp * timePtr;
  spId class;

for (class = lookup(id->Class); class; class = getSuperclass(class)) {
    for (i = getClassNumFields(class)-1; i >= 0; i--) {
      if (fieldTIME & getClassFields(class)[i].properties) {
timePtr = (TimeStamp *)((char *)id + getClassFields(class)[i].offset);
*timePtr = TPlus(*timePtr, delta);
      }
    }
  }
  return 0;
} int shiftTimes(Message *id, TimeStamp delta) {
  int i;
  TimeStamp * timePtr;
  spId class;

for (class = lookup(id->Class); class; class = getSuperclass(class)) {
    for (i = getClassNumFields(class)-1; i >= 0; i--) {
      if (fieldTIME & getClassFields(class)[i].properties &&
    !(fieldLOCAL & getClassFields(class)[i].properties)) {
timePtr = (TimeStamp *)((char *)id + getClassFields(class)[i].offset);
*timePtr = TPlus(*timePtr, delta);
      }
    }
  }
  return 0;
}
```

```
/* This assumes the msg is a message describing some object.  To get
   time adjustments right, we also assume that this is called on EVERY
   incoming message and that nobody ever looks at a time until correct
   adjustment has been made. */

/* HERE WE ARE ASSUMING THAT ALL MACHINES ARE SYNCHORNIZED IN TIME
   WITHIN A FEW TENS OF MINUTES SINCE TimeOfUpdate IS NOT A 'TIME'
   FIELD THAT GETS SYNCHRONIZED ON! */ int estimateTimeDelay(Message *msg) {
  TimeStamp correction;
  DelayInfo *netDelay;

/* must remove this test because tiny probability of failing */
  assert(msg->MsgSendTime != 0);

#if 0 /* here wait 'til after COMDEX */
  /* if this proc early in the week and message is from late in the week,
     it must be from last week, shift the times to fix up. */
  if (thisproc->wm->wmtime < TIMESTAMPMAX/100
      && msg->MsgSendTime > 99*(TIMESTAMPMAX/100)) {
    shiftTimes(msg, -TIMESTAMPMAX);
  }
  /* if this proc late in the week and message is from early in the week,
     it must be from next week, shift the times to fix up. */
  if (thisproc->wm->wmtime < TIMESTAMPMAX/100
      && msg->MsgSendTime > 99*(TIMESTAMPMAX/100)) {
    shiftTimes(msg, TIMESTAMPMAX);
  }
endif netDelay = netDelayOf(msg->MsgSender);
  if (netDelay == NULL) {
    if (netDelaysIndex == MAXSPLINES) {
      zwarn("Cannot handle more than %d Splines\n", MAXSPLINES);
      return FALSE;
    }
    netDelays[netDelaysIndex].sender = msg->MsgSender;
    netDelay = &netDelays[netDelaysIndex].delayInfo;
    netDelaysIndex ++;
    netDelay->countReset = 33;
    netDelay->count = 0;
    netDelay->accuracy = MACHINECLOCKRESOLUTION;
    netDelay->min = 1;
    netDelay->ideal = 15;
    netDelay->max = 30;
    /* here, is this 5 bogus? */
    netDelay->offset = TDelta(GetT()+5, msg->MsgSendTime);
    netDelay->ave = 5;
  }
  else if (TsynchCount(netDelay)) {
    Tsynch(0, NULL,
     TPlus(msg->MsgSendTime, netDelay->offset),
     netDelay, &correction);
     if (ZTEST(NET, 4) || (ZTEST(NET, 3) && correction!=0))
       zprintf("   Net offset%9ld delay%9ld delayC%9ld\n",
       netDelay->offset, netDelay->ave, correction);
     ZZZZ(NET) netDelay->count = 0;
  }
  shiftTimes(msg, netDelay->offset);
  return TRUE;
} unsigned long spHostFromName(char *hostname) {
  static unsigned long thishost = 0;
```

- 33 -

```c
    unsigned long hostnum = 0;
    char hostbuf[200];
    char *hname;
    struct hostent *host;

if (hostname == NULL || *hostname == '\0') {
      if (thishost != 0) return thishost;
      zero(gethostname(hostbuf, sizeof(hostbuf)));
      hname = hostbuf;
    }
    else {
      hname = hostname;
    }
    if (assert((host = gethostbyname(hname)) != NULL)) {
      hostnum = *((unsigned long *)host->h_addr_list[0]);
      if (hostname == NULL && thishost == 0) thishost = hostnum;
    }
    return hostnum;
} include <unistd.h>
include <stdlib.h>
#include <string.h>
#include <stdio.h>
#ifdef mips
#include <malloc.h>
endif include <zdebug.h>
include <spline.h>
include <spline/objdefs.h>
#include <spline/network.h>
#include <spline/share.h>
include <spline/time.h> include <spline/Xmain.c> extern spLocale lookingfor; /* here this is ugly */
extern void saveCheckClasses(void);
extern void checkClasses(void);
extern void objectReport(void);

/* Output sample rate to headphones */
#define DEFAULTSOUNDRATE 16000
/* Input sample rate of microphone */
#define DEFAULTSPEECHRATE 16000
/* The encoding format for speech */
define DEFAULTINTERNALSOUNDFORMAT SP16LINEAR16MONO define SUBSPACEINTERVAL 10000
define MAXMSGINTERVALMSECS 24000
#define LINK_TIMEOUT 12*60*60*1000 /* 12 hours */
#define OTHERS_TIMEOUT 50000
#define ACTIONS_IN_A_ROW 3
#define LINKS_IN_A_ROW 2
define OTHERS_IN_A_ROW 2 spDuration currentTimeout = OTHERS_TIMEOUT;

extern boolean addDRtoAction(spId id, void *data);

/* for zdebug */
int NET = 0;
int LEAK = 0;
int GRAPHICS = 0;
int FRAME = 0;
int OBJ = 0;
```

```
int LOOPAUDIO = 0;
int DR = 0;
extern int MALLOC;

struct MicSHM *micSHM = NULL;
struct PhonesSHM *phonesSHM = NULL;

/* functions defined in this file (in order) */ void updateWmObjects(void);
void scanWmObjs(void);
static boolean satisfyNow(spId id);
static boolean updateWmObj(spId id, void *ignore);
static boolean doWmAction(spId id, void *ignore);
void shiftToNextWeek(void);
void wmJustAddedObject(void *idPtr);
void wmJustRemovedObject(void *idPtr);
void wmFreeObject(void *idPtr);

void validateAllReferrers(void); /* in objdefs.c */ static ProcData proc;
ProcData *thisproc;

char *procname(char *path) {
  char *myname;

if ((myname = strrchr(path, '/')) == NULL) myname = path;
  else myname++;

if (strlen(myname) > 15) myname[15] = '\0';
  return myname;
}

/* World-model initialization.  Initializes the standard classes, and
   the dynamic and static object hash tables.  Returns OK upon
   successful initialization. */ void spInitProc(int argc, char **argv, int version) {
  char *zenv = getenv("ZDEBUG");
  char *name = procname(argv[0]);
  char *soundrateenv = getenv("SPLINESOUNDRATE");
  char *speechformatenv = getenv("SPLINESPEECHFORMAT");
  long soundrate;
  int i;
  int owner;

zinit(name, proc.z, ZENTRIES,
"warn1:errno1:zproc1:ztime1:audio1:bdi2", FALSE);

assert(NET = zregister("net", "network"));
#ifdef MEMLEAK
  assert(LEAK = zregister("leak", "memory leak detection"));
#endif
  assert(GRAPHICS = zregister("graphics", "graphics"));
  assert(FRAME = zregister("frame", "frame timing"));
  assert(OBJ = zregister("obj", "objects coming and going"));
  assert(DR = zregister("dr", "dead reckoning"));
  assert(LOOPAUDIO = zregister("loopaudio", "loopback live audio"));

if (zenv != NULL) zargs(zenv);

if (version != SPLINEVERSION) {
    zwarn("Running against the wrong version of the Spline library.\n");
  } thisproc = &proc;
```

- 35 -

```
  thisproc->secondsBase = getSecondsBase();  /* this must set up before network
  streamInit();

thisproc->name = name;
  thisproc->pid = getpid();
  thisproc->host = spHostFromName(NULL);
  thisproc->displayhost = spDisplayHost();
  thisproc->audiodisplayhost = spAudioDisplayHost();
  soundrate = DEFAULTSOUNDRATE;
  thisproc->speechformat = DEFAULTINTERNALSOUNDFORMAT;
  if (speechformatenv != NULL) {
    if (strcasecmp(speechformatenv, "ulaw") == 0)
      thisproc->speechformat = SP8ULAW8MONO;
    else if (strcasecmp(speechformatenv, "adpcm") == 0)
      thisproc->speechformat = SP8ADPCM4MONO;
    else if (strcasecmp(speechformatenv, "linear8") == 0)
      thisproc->speechformat = SP8LINEAR16MONO;
    else if (strcasecmp(speechformatenv, "linear16") == 0)
      thisproc->speechformat = SP16LINEAR16MONO;
    else if (strcasecmp(speechformatenv, "linear32") == 0)
      thisproc->speechformat = SP32LINEAR16MONO;
    else if (strcasecmp(speechformatenv, "gsm") == 0)
      thisproc->speechformat = SP_05GSM8_33;
    else zwarn("unsupported SPLINESPEECHFORMAT\n");
  }
  if (soundrateenv != NULL) {
    int rate = atoi(soundrateenv);

if ((rate != 8000 && rate != 16000 && rate != 32000 && rate != 48000) ||
(rate < thisproc->speechformat->rate)) {
      zwarn("a sound rate of %d won't work\n");
    }
    else {
      soundrate = rate;
      printf("sound rate set to %ld\n", soundrate);
    }
  }
  thisproc->micFormat = *SP8LINEAR16MONO;
  thisproc->micFormat.rate = thisproc->speechformat->rate;
  thisproc->audioSinkFormat = *SP8LINEAR16STEREO;
  thisproc->audioSinkFormat.rate = soundrate;
  thisproc->DRTolerance = 0.01; /* Dead-reckoning tolerance (meters). */
  thisproc->fakePartner = FALSE;
  thisproc->wm = (struct wm *) calloc(1, sizeof(struct wm));
  thisproc->wm->nameCounter = 0;
  /* This needs to be issued by some central spline process to guarantee
     uniqueness, but this works OK for testing now. */
  owner = ((spHostFromName(NULL) & 0377) << 8) + (thisproc->pid & 0377);
  thisproc->wm->nameOwner = owner;
  thisproc->wm->wmtime = GetT();
  thisproc->seconds = seconds;
  for (i = 0; i < WMOHTSIZE; i++) thisproc->wm->wmOHT[i] = NULL;

queueInit(&(thisproc->wm->JustAddedObjects),
    malloc(6000 * sizeof(void *)),
    6000, sizeof(void *));
  queueInit(&(thisproc->wm->JustRemovedObjects),
    malloc(OBJCHANGESPERFRAME * sizeof(void *)),
    OBJCHANGESPERFRAME, sizeof(void *));
  queueInit(&(thisproc->wm->objectsToFree),
    malloc(OBJCHANGESPERFRAME * sizeof(void *)),
    OBJCHANGESPERFRAME, sizeof(void *));

networkInit();
  initClasses();
  saveCheckClasses();
```

```c
  ZZ(OBJ) {checkClasses(); validateAllReferrers();}
#ifdef mips
  Z(MALLOC) {
    mallopt(M_DEBUG, 1);
    zprintf("malloc debugging enabled\n");
  }
endif
} extern void removeFromIndex(spId id); /* in objdefs.c */
extern void handleSpIdRemove(spId id); /* in objdefs.c */
extern void sendRemoveActionFor(spId id); /* in objdefs.c */

/* send all the remove messages first so spline will know
   what locales to send them to. */ boolean reinit1(spId id, void *ignore) {
  if (getClass(id) != spcClass) {
    sendRemoveActionFor(id);
  }
  return FALSE;
}

/* Then get rid of all the objects themselves */ void stopAllListening(spId pov); /* in network.c */ boolean reinit2(spId id, void *ignore) {
  if (getClass(id) == spcSlot) {
    handleSpIdRemove(id);
    removeFromIndex(id);
    wmFreeObject((void *)&id);
  }
  else if (getClass(id) != spcClass) {
    spRemove(id);
    wmFreeObject((void *)&id); /* spReinit blanks the removed queue */
  }
  return FALSE;
} extern flushALocs(void); /* in audiomodule.c */ void spReinit(void) {
  spExamineWorldModel(spcSlot, reinit1, NULL);
  spExamineWorldModel(spcSlot, reinit2, NULL);
  queueReset(&(thisproc->wm->JustAddedObjects));
  queueReset(&(thisproc->wm->JustRemovedObjects));
  queueReset(&(thisproc->wm->objectsToFree));
  spRemCallbacks();
  flushALocs();
} spDuration spUpdateWorldModel(spDuration interval) {
  static boolean first = TRUE;
  static TimeStamp lastframe;
  TimeStamp thisframe;
  TimeStamp target;
  spDuration waittime;
  extern void networkAudit(void);

Z(FRAME) zprintf("-----------F R A M E-----------\n");
  thisproc->seconds = seconds;

if (first) {
    first = FALSE;
    lastframe = GetT();
    ZZZZ(FRAME) {
```

- 37 -

```c
      printf("(%d) ", (int)interval);
      fflush(NULL);
    }
  } updateWmObjects();

ZZ(OBJ) networkAudit();
  Z(OBJ) objectReport();

target = TPlus(lastframe, interval);
  waittime = (spDuration) TDelta(target, GetT());
  if (waittime > 5) {
    poll(0, 0, waittime);
  }
  thisframe = GetT();
  interval = (spDuration) TDelta(thisframe, lastframe);
  lastframe = thisframe;
  ZZZZ(FRAME) {
    printf("(%d) ", (int)interval);
    fflush(NULL);
  } if (interval > currentTimeout/10) {
    currentTimeout = 1000000;
  }
  else {
    /* here should make this decay work better */
    currentTimeout = (int) (currentTimeout - 200); /* 200 * 5000 = 100000 */
    if (currentTimeout < OTHERS_TIMEOUT) currentTimeout = OTHERS_TIMEOUT;
  }
  return interval;
}

/* if anyone has been waiting at least 200msec, send almost everything */
static boolean satisfyNow(spId id) {
  if (id) {
    if (isSubspaceObj(id) || lookingfor == -2) return FALSE;
    if (lookingfor != -1) {
      if (getLocaleId(id) != lookingfor &&
    !myNeighbor(lookingfor, getLocaleId(id))) return FALSE;
    }
  }
  if (thisproc->wm->oldestUnsatisfied > 0
      && TDelta(thisproc->wm->wmtime, thisproc->wm->oldestUnsatisfied) > 200)
    return TRUE;
  else return FALSE;
}

/* Iterate through all objects in the world model, performing
   actions, and generating any relevant network updates needed. */ void updateWmObjects(void) {
  ZZ(OBJ) {
    checkClasses();
    validateAllReferrers();
  }
  thisproc->wm->wmtime = GetT();
  if (thisproc->wm->wmtime > TIMESTAMPMAX) shiftToNextWeek();
  processIncomingMsgs();
  /* process removed objects, must do before adds in case
     an object is being replaced. */
  queueApply(&thisproc->wm->JustRemovedObjects, wmJustRemovedObject);
  /* process newly added objects */
  queueApply(&thisproc->wm->JustAddedObjects, wmJustAddedObject);
  /* Do actions before updates, they might change things and thereby
```

```
      trigger callbacks. */
  spExamineWorldModel(spcAction, doWmAction, NULL);
  /* Next check which objects have to be updated over net,
     queue callback functions, and then set change bits back to zero. */
  spExamineWorldModel(spcAny, updateWmObj, NULL);
  if (satisfyNow(NULL)) {
    thisproc->wm->oldestUnsatisfied = 0;
    lookingfor = -2;
  }
  /* At the last moment before returning to user, free removed objects */
  queueApply(&thisproc->wm->objectsToFree, wmFreeObject);
  ZZ(OBJ) {
    checkClasses();
    validateAllReferrers();
  }
} static boolean doWmAction(spId id, void *ignore) {
  doClassFn(id);
  return FALSE;
} static int resendInterval(spId id) {
  if (isSubspaceObj(id)) return SUBSPACEINTERVAL;
  return MAXMSGINTERVALMSECS;
} static int timeout(spId classid) {
  if (subclass(classid, spcLink)) return LINK_TIMEOUT;
  return currentTimeout;
} static int framesInARow(spId classid) {
  if (subclass(classid, spcAction)) return ACTIONS_IN_A_ROW;
  if (subclass(classid, spcLink)) return LINKS_IN_A_ROW;
  return OTHERS_IN_A_ROW;
} static boolean keepAlive(spId id) {
  spDuration interval = TDelta(thisproc->wm->wmtime, getTimeOfUpdate(id));
  int msgs = getMessagesSinceUpdate(id);

if (msgs < framesInARow(getClass(id)) && interval > 0) {
    return TRUE;
  }
  if (interval+(01777 & (long)id) > resendInterval(id)) {
    /* flag is needed inside networkSend */
    setMsgNeeded(id);
    return TRUE;
  }
  if (getTimeOfUpdate(id) > thisproc->wm->newestUnsatisfied) return FALSE;
  if (satisfyNow(id)) {
    ZZ(OBJ) zprintf("satisying w/ obj (0x%08x-%s)\n",
   id, getClassName(getClass(id)));
    /* will reset counter so multiple copies will be sent */
    setMsgNeeded(id);
    return TRUE;
  }
  return FALSE;
} static boolean updateWmObj(spId id, void *ignore) {
  /* maybe send update message */ if (spSelfOwns(id) &&
      !(subclass(getClass(id), spcAction) && getActionNoMsg(id))) {
    /* Message for new object might already have been sent */
```

```
    if ((getMsgNeeded(id) && thisproc->wm->wmtime != getTimeOfUpdate(id))
|| keepAlive(id)) {
      networkSend(id);
    }
  }
  /* maybe kill other process's object because no message in a long time */
  if (getClass(id) != spcClass && !spSelfOwns(id) &&
      (TDelta(thisproc->wm->wmtime, getTimeOfUpdate(id))
       > timeout(getClass(id)))) {
    ZZ(OBJ) zprintf("timing out obj (0x%08x-%s) wmT %ld idT %ld timeout %ld\n",
    id, getClassName(getClass(id)),
    thisproc->wm->wmtime,
    getTimeOfUpdate(id), timeout(getClass(id)));
    spRemove(id);
  }
  doChangeCallbacks(id);

/* reset change bits */
  setChanges(id, 0);
  return FALSE;
} boolean shiftObjToNextWeek(spId id, void* ignore) {
  shiftAllTimes((Message *)id, -TIMESTAMPMAX);
  return FALSE;
}

/* before we can write this completely right, we must locate every stored
   timeStamp in the system! and make sure that there are never any stored
   times out of Splines control. */ void shiftToNextWeek(void) {
  thisproc->wm->wmtime -= TIMESTAMPMAX;
  thisproc->baseStamp -= TIMESTAMPMAX;
  thisproc->secondsBase += TIMESTAMPMAX/1000;
  /* more specific timestamps shifted? */ spExamineWorldModel(spcAny, shiftObjToNextWeek, NULL);
}

/* This does all the processing that is needed when a new object is added
   to the world model.  This includes:
   1- Sending out the first message about the object.
      Note doing this here means that even if the object is an action that
      immediately removes itself when it runs, a message about it will go out!
   2- Setting up the right callback. */ void wmJustAddedObject(void *idPtr) {
  spId id = *(spId *)idPtr;

if (getClass(id) != spcSlot) {
    if (spSelfOwns(id)) {
      if (!(subclass(getClass(id), spcAction) && getActionNoMsg(id))) {
setMsgNeeded(id);
networkSend(id);
      }
    }
    doJustAddedCallbacks(id);
  }
}

/* This does all the processing that is needed when an object is removed
   from the world model.  This includes:
   1- sending out a remove message if needed.
   2- setting up the right callback.
   3- queue for freeing of storage. */
```

- 40 -

```
void wmJustRemovedObject(void *idPtr) {
  spId id = *(spId *)idPtr;

if (getClass(id) != spcSlot) {
    doJustRemovedCallbacks(id);
  }
  enqueue(&thisproc->wm->objectsToFree, &id);
} void wmFreeObject(void *idPtr) {
  spId id = *(spId *)idPtr;

setMsgCode(id, SPLINEREMOVED);
  free((void *)((char *)id-getClassOffset(getClass(id))));
} include <values.h>
include <sys/param.h>
#include <string.h>
#include <time.h>
#include <stdarg.h>
#include <stdio.h>
#include <sys/types.h>
#include <sys/stat.h>
#include <fcntl.h>
#include <unistd.h>
#include <math.h>
#include <limits.h>
#ifdef mips
#include <malloc.h>
endif include <zdebug.h> include <spline.h>
include <spline/objdefs.h>
include <spline/share.h>
#include <spline/network.h>
include <spline/time.h> extern void PrintMatrix(spTMatrix *t);
extern int DR;
extern int LOCALE;

spId watch = NULL;

/* functions defined in this file (in order) */ boolean checkId(spId id, spId classId, boolean owns);
void initClass(spId *idPtr, spId *superIdPtr, char *classname,
        int globalSize, int totalSize, spName name, int filterBits,
        int fn, int make, int init, int changeFn, int numFields);
int spSubclass(spId c1, spId c2);
void spDecodeClass(spId id);
void setSpId(spName * name, spIdLink * link, spId id);
void handleSpIdChange(spId old, spId new);
spId newObj(spId id, void ** ptr, int extra);
spId makeLink(spId classId, va_list ap);
static void genName(spId id);
spId lookup(spName name);
spId robustLookup(spName name);
spId addChaining(spId id);
spId addOne(spId id);
void addToIndex(spId id);
void actionRemoveSelf(spId id);
void spRemove(spId id);
void removeFromIndex(spId id);
```

```
void spExamineWorldModel(spId classId, spObjFn *fn, void *data);
void spPrint(spId id);
void processObjMsg(void *msg);
void textLinkWriter(spId placard, spDuration interval);
void polhemusDataMotionLink(spId id);
void handlePossibleLocaleChange(spId oldParent, spId newParent, spId child);

spId spRequestOwnership(spId object, spDuration timeout) {
  zwarn("Ownership changes cannot be made now");
  return NULL;
} void spSatisfyOwnershipRequest(spId ownershipReqeust) {
  zwarn("Ownership changes cannot be made now");
}

/* spName's */

/* Currently an spName has the following form.  The only
   dependence on the format of these names is in this single file.
     The name 0 indicates no object.
     For classes, nameOwner==0 and nameId is a small integer chosen so
   that the classes will be very well distributed in the object hash table.
     For other objects, nameOwner is the 16 bit owner tag !=0 of the
   owning process and nameId is a 16 bit id guaranteeing uniqueness.
   (Max 64k simultaneous objs per owner.)
     thisproc->wm->nameOwner is current set based on a combination of
   bits from the host num and pid (see wmobj.c).  In the future it
   must be set by some centralized means to guarantee uniqueness. */ typedef struct {
  short int owner;
  short int id;
} spNameStruct;

#define nameOwner(name) (((spNameStruct *)(& (name)))->owner)
#define nameId(name) (((spNameStruct *)(& (name)))->id)

static void genName(spId id) {
  spName name;
  if (id == NULL) return;
  else /* some other named class */ {
    nameOwner(name) = thisproc->wm->nameOwner;
    nameId(name) = thisproc->wm->nameCounter++;
    setName(id,name);
  }
} include <spline/Xobjdefs.c>

/* These next few functions are used by Xobjdefs.c */

/* Demands id is not NULL, returns TRUE if it finds a problem. */ boolean checkId(spId id, spId classId, boolean owns) {
  static int lastversionwarning = 0;

if (id == NULL) {
    zwarn("id is NULL\n"); return TRUE;
  } if (getMsgCode(id) == SPLINEREMOVED) {
    zwarn("spId %#1X has been freed\n", (long)id);
    return TRUE;
  }
  else if (getMsgCode(id) != SPLINEVERSION) {
    if (thisproc->seconds - lastversionwarning < 60) {
```

```
      zwarn("once-a-minute version mismatch: id is not object %#lx\n", (long)id)
      lastversionwarning = thisproc->seconds;
    }
    /* here was returning TRUE */
  }
  if (!(classId == spcSlot || subclass(getClass(id), classId))) {
    zwarn("id is of class %s, not %s\n",
  getClassName(getClass(id)), getClassName(classId));
    return TRUE;
  }
  if (owns && getName(id)!=0 && !spSelfOwns(id)){
    zwarn("process not owner of id %#lx\n", (long)id);
    return TRUE;
  }
  return FALSE;
} boolean spSameOwner(spId x, spId y) {
  return nameOwner(getName(x)) == nameOwner(getName(y));
} boolean spSelfOwns(spId obj) {
  return thisproc->wm->nameOwner == nameOwner(getName(obj));
} int spSubclass(spId c1, spId c2) {
  if (checkId(c1, spcClass, FALSE)) return FALSE;
  if (checkId(c2, spcClass, FALSE)) return FALSE;
  return subclass(c1, c2);
} boolean spDescendant(spId child, spId parent) {
  for (; child; child = getParent(child)) {
    if (child == parent) return TRUE;
  }
  return FALSE;
} static char compare[60][2000];
static void *classsstart[60];
static int classlen[60];
static int classes;

/* This initializes the variables holding the standard class ids.
   It needs to be called by the world model whenever initialization occurs. */ void initClass(spId *idPtr,       /* spot to store class */
      spId *superIdPtr,  /* superclass */
      char *classname,   /* class name */
      int globalSize,    /* size of global fields */
      int totalSize,     /* size of all fields */
      spName name,       /* name of class (owner zero) */
      int filterBits,    /* Inherent marker bits for class */
      int fn,            /* index of class function */
            int make,          /* index of make function */
            int init,          /* index of init function */
      int changeFn,      /* index of change function */
      int numFields) {   /* number of non-inherited fields */
  spId id, sup;
  int i;
  void *objstart;
  int objlen;

objlen = sizeof(struct _spcClassLocal) + numFields*sizeof(FieldDescriptor);
  assert((objstart = (spId)calloc(1, objlen)));
  id = (spId)((char *)(objstart)
      +(sizeof(struct _spcClassLocal)
```

```
-sizeof(struct _spcClassGlobal)));
  setClassFields(id, (FieldDescriptor *)((char *)id
+ sizeof(struct _spcClassGlobal)));
  setMsgCode(id, SPLINEVERSION);
  setName(id, name);
  for (i = 0; i < numFields; i++) getClassFields(id)[i].class = id;
  if (spcClass) {
    initspcClassLinks(id);
    if (superIdPtr) setSuperclass(id, *superIdPtr);
  }
  *idPtr = id; /* must be after last line */
  setClassName(id, classname); /* must be before next line */
  for (sup = id; sup; sup=getSuperclass(sup)) {
    getSuperclasses(id)[getName(sup)] = 1;
  }
  /* Have to hack here because some superclasses not in the objs yet */
  getSuperclasses(id)[1] = 1;              /* everything is a slot */
  if (name>1) getSuperclasses(id)[2] = 1;  /* almost all are an any */
  setClassSize(id, (totalSize+3) & ~3);    /* for safety */
  setClassOffset(id, totalSize-globalSize);
  setClassFilterBits(id, filterBits);
  setClassNumFields(id, numFields);
  setClassFn(id, fn);
  setMakeFn(id, make);
  setInitFn(id, init);
  setChangeFn(id, changeFn);
  addToIndex(id);
  classlen[name] = objlen - ((char *) id - (char *)objstart);
  classstart[name] = (void *)id;
  classes = name;
} void saveCheckClasses (void) {
  int i;
  for (i=1; i<=classes; i++) {
    memcpy((void *)&compare[i][0], (void *)classstart[i], classlen[i]);
  }
} void checkClasses(void) {
  int i;

for (i=1; i<=classes; i++) {
    if (memcmp(classstart[i], (void *)compare[i], classlen[i]))
      zwarn("memory BASHED!\n");
  }
} static boolean removingParent(spId child, void *parent) {
  handlePossibleLocaleChange((spId) parent, NULL, child);
  return FALSE;
}

/* Handle getting rid of spId and spName. */
/* Here should make it so that if a slot has no referrers
   it is removed. */ void handleSpIdRemove(spId id) {
  spIdLink * link;
  spIdLink * next;
  spId whole, class;
  spName * name;
  int i;
  FieldDescriptor * field;

ZZ(OBJ) validateReferrers(id, FALSE);
  spExamineChildren(id, removingParent, (void *)id);
```

- 44 -

```
  /* get rid of all references to id */
  for (link = (spIdLink *)getReferrers(id); link; link = next) {
    next = link->next;
    assert(link->field && (fieldSPID & link->field->properties));
    whole = (spId)((char *)link - link->field->linkOffset);
    if (link->field->changeBit) {
      setChanges(whole, getChanges(whole) | link->field->changeBit);
    }
    name = (spName *)((char *)whole + link->field->offset);
    *name = 0;
    link->id = NULL;
    /* the following just for extra safety */
    link->prev = NULL;
    link->next = NULL;
  }
  setReferrers(id, NULL);
  /* take id's fields out of link chains pointing to others.
     Leave the pointers to others however, so that a remove callback
     can work. (We may get rid of this later.) */
  for (class = getClass(id); class; class = getSuperclass(class)) {
    for (i = getClassNumFields(class)-1; i >= 0; i--) {
      field = &getClassFields(class)[i];
      if (fieldSPID & field->properties) {
link = (spIdLink *)((char *)id + field->linkOffset);
ZZ(OBJ) validateSpIdLink(link, 0, FALSE);
/* take out of old list */
if (link->prev) link->prev->next = link->next;
if (link->next) link->next->prev = link->prev;
/* the following just for extra safety, note keep ->id */
link->prev = NULL;
link->next = NULL;
      }
    }
  }
} typedef spId MakeFn(spId classId, va_list ap);

spId spMake(spId classId, ...) {
  MakeFn * makeFn;
  va_list ap;
  spId id;

if (checkId(classId, spcClass, FALSE)) return NULL;
  makeFn = ((MakeFn *)(methodTable[getMakeFn(classId)]));
  if (makeFn == NULL) zwarn("%s has no make function\n",
    getClassName(getClass(id)));
  va_start(ap, classId);
  id = makeFn(classId, ap);
  va_end(ap);

genName(id);
  addToIndex(id);

/* do this after the object has a name, rather than in makeLink */
  if (subclass(classId, spcLink)) doClassFn(id);
  enqueue(&thisproc->wm->JustAddedObjects, &id);
  return id;
} typedef void InitFn(spId id);

/* This is the basic object making function. */

/* Note special make functions can malloc some additional memory as
   part of the object. (This is facilitated by the extra arg below.)
   Note things are set up so that this extra memory will be sent in
```

- 45 - messages, but it is imperative that if this is the case, then this
space cannot every grow! If the extra space is not supposed to be
in messages, then you must reduce the message length to the proper
point. */

```c
spId newObj(spId classId, void **ptr, int extra) {
  InitFn * initFn;
  char * P;
  int size = (getClassSize(classId)+extra+3) & ~3;
  spId newId;

if (checkId(classId, spcClass, FALSE)) return NULL;
  assert((P = (char *)calloc(1, size)));
  if (extra!=0 && ptr) *ptr = (void *)(P+getClassSize(classId));
  newId = (spId)(P+getClassOffset(classId));
  setMsgCode(newId, SPLINEVERSION); /* must do first */
  setClass_(newId, getName(classId)); /* for debugging */
  initFn = ((InitFn *)(methodTable[getInitFn(classId)]));
  assert(initFn);
  initFn(newId);
  setClass(newId, classId);
  setMsgSender(newId, thisproc->host);
  setProcessName(newId, thisproc->name);
  setMsgLength(newId, size-getClassOffset(classId));
  setFilterBits(newId, getClassFilterBits(classId));
  return newId;
}

/* Special make functions.  */ spId makeLink(spId classId, va_list ap) {
  char *arg = va_arg(ap, char *);
  char *url = va_arg(ap, char *);
  int arglen = strlen(arg);
  int len = arglen+strlen(url);
  spId id;
  char *buffer;

if (len>499) {
    zwarn("Link arg and/or URL too long\n");
    return NULL;
  }
  assert((id = newObj(classId, (void **)&buffer, len+2)));
  setLinkArg(id, buffer);
  strcpy(buffer, arg);
  setLinkURL(id, buffer+arglen+1);
  strcpy(buffer+arglen+1, url);
  return id;
} static boolean newlocale(spId child, void *r) {
  struct reparent *reloc = (struct reparent *) r;

setLocaleId(child, reloc->newl);
  setChangedLocaleId(child, 0);
  if (subclass(getClass(child), spcPOV)) relocatePOV(child, reloc);
  return FALSE;
} void handlePossibleLocaleChange(spId oldParent, spId newParent, spId child) {
  struct reparent reloc;

/* the network code needs to know when a pov changes locales */
  reloc.oldl = localeIdOf(oldParent);
  reloc.newl = localeIdOf(newParent);
  if (reloc.oldl != reloc.newl) {
    reloc.child = child;
```

```
    reloc.oldp = oldParent;
    reloc.newp = newParent;

ZZZZ(LOCALE) zprintf("reparenting %s 0x%08x from within "
 "locale #%d to locale #%d\n",
 getClassName(getClass(child)), child,
 reloc.oldl, reloc.newl);
    newlocale(child, &reloc);
    spExamineDescendants(child, newlocale, (void *)&reloc);
    ZZZZ(LOCALE) zprintf("reparenting complete\n");
  }
}

/* special set and get functions */
void setParentFunction(spId child, spId newParent) {
  spId oldParent = getParent(child);

if (oldParent != newParent) {
    /* here we check that the filter bits are correct */ setSpId(&(getParent_(child)), &(getParent_link(child)), newParent);

handlePossibleLocaleChange(oldParent, newParent, child);
  }
}

/* THE WORLD MODEL HASH TABLE */

/* This looks objects up in the hash table. */ spId lookup(spName name) {
  spId id;

if (name == 0) return NULL;
  for (id = thisproc->wm->wmOHT[nameId(name) % WMOHTSIZE];
       id!=NULL;
       id = getNext(id)) {
    if (name == getName(id)) return id;
  }
  return NULL;
}

/* This makes sure something is in the table! */ spId robustLookup(spName name) {
  spId id = lookup(name);
  if (name && !id) {
    id = newObj(spcSlot, NULL, 0);
    setName(id, name);
    addToIndex(id);
    ZZ(OBJ) zprintf("pom: made slot for name (0x%08x-%s)\n",
    name, getClassName(getClass(id)));

}
  return id;
} void addToIndex(spId id) {
  spId * bucket = &(thisproc->wm->wmOHT[nameId(getName(id)) % WMOHTSIZE]);

setNext(id, *bucket);
  *bucket = id;
} void removeFromIndex(spId id) {
  spId tmp, last;
  int hashVal = nameId(getName(id)) % WMOHTSIZE;
```

```
  invalidateLocatorsFor(id);
  for (last = NULL, tmp = thisproc->wm->wmOHT[hashVal]; tmp ;
       last = tmp, tmp = getNext(tmp)) {
    if (tmp == id) {
      if (last == NULL) thisproc->wm->wmOHT[hashVal]=getNext(tmp);
      else setNext(last, getNext(tmp));
      break;
    }
  }
  setNext(id, NULL);
}

/* The following short circuits creating the removeAction object locally */ static spId removeAction = NULL;

void sendRemoveActionFor(spId id) {
  if (spSelfOwns(id)
      && getClass(id) != spcClass
      && !(subclass(getClass(id), spcAction) && getActionNoMsg(id))
      && getParent(id)) {
    if (removeAction == NULL) {
      /* we do weird stuff here so removeAction not linked into WM */
      removeAction = newObj(spcRemoveAction, NULL, 0);
      setClass(removeAction, NULL);
      setClass_(removeAction, getName(spcRemoveAction));
      getClass_link(removeAction).id = spcRemoveAction;
    }
    setActionObj_(removeAction, getName(id));
    setParent_(removeAction, getName(getParent(id)));
    setLocaleId(removeAction, getLocaleId(id));
    getParent_link(removeAction).id = getParent(id);
    networkSend(removeAction);
    setActionObj_(removeAction, 0);
    setParent_(removeAction, 0);
    getParent_link(removeAction).id = NULL;
  }
}

/* here think what happens if you remove somebody elses object and then
   it pops back? */

/* here should probably really change things so freeing is more immediate! */ void spRemove(spId id) {
  extern void stopAllListening(spId);

if (checkId(id, spcSlot, FALSE)) return;
  if (getClass(id) == spcClass) {
    zwarn("Cannot remove builtin class %s\n", getClassName(id));
    return;
  }
  if (subclass(getClass(id), spcPOV) && getListeningBits(id)) {
    stopAllListening(id);
  }
  sendRemoveActionFor(id);
  handleSpIdRemove(id);
  removeFromIndex(id);
  enqueue(&thisproc->wm->JustRemovedObjects, &id);
}

/* This allows an action to remove itself without ever sending a
   message about it to any other machine.  Note this is needed,
   because the action is likely to get done a bit sooner on the owning
   machine than on other machines, and shouldn't abnormally terminate
   the action on remote machines.  On the other hand, if the action is
```

- 48 -

```
   terminated early on the owning machine by a remove triggered from
   outside the action, then early termination on other machines is
   appropriate. */ void actionRemoveSelf(spId id) {
  if (checkId(id, spcAction, FALSE)) return;
  setActionNoMsg(id, TRUE);
  spRemove(id);
} typedef void ChangeFn(spId old, spId new);

void checkChanges(spId old, spId new) {
  ChangeFn * fn;

fn = ((ChangeFn *)(methodTable[getChangeFn(getClass(old))]));
  if (fn == NULL) zwarn("%s has no change function\n",
getClassName(getClass(old)));
  else fn(old, new);
}

/* eventually something in here to handle changes in link data */ void updateExistingObj(spId existingId, spId msg) {
  if (!(assert(getClass_(msg) == getClass_(existingId)) &&
assert(getMsgLength(msg) == getMsgLength(existingId))))
    return;
  checkChanges(existingId, msg);
  memcpy((void *)existingId, (void *)msg, getMsgLength(msg));
} spId createNewObj(spId msg) {
  spId msgClass = lookup(getClass_(msg));
  int offset = getClassOffset(msgClass);
  int size = getMsgLength(msg)+offset;
  spId newId;
  int extra = 0;

if (size > getClassSize(msgClass)) extra = size-getClassSize(msgClass);
  newId = newObj(msgClass, NULL, extra);
  checkChanges(newId, msg);
  memcpy((void *)newId, (void *)msg, getMsgLength(msg));
  addToIndex(newId);
  /* This is going to have to spawn a process in the future */
  if (subclass(getClass(newId), spcLink)) doClassFn(newId);
  enqueue(&thisproc->wm->JustAddedObjects, &newId);
  return newId;
}

/* Process the contents of an object message.  This may require
   updating an object that is already known, or introducing a new
   object into the world model.  This also handles object remove
   messages. */ void processObjMsg(void *msg) {
  spId id = (spId)msg; /* be careful, local fields missing */
  spId existingId, newId;
  spId class = lookup(getClass_(id));

if (getMsgCode(id) != SPLINEVERSION) return; /* just ignore */
  if (spSelfOwns(id)) return; /* ignore any messages about our own objects */ if (getClassFilter(class)) return; /* ignore if filtered out */

/* here are special cases for COMDEX. This should be generalized. */
  if (strcmp(thisproc->name, "spvisual") != 0 &&
      subclass(class, spcAppearanceLink)) return;
```

- 49 -

```c
    if (strcmp(thisproc->name, "spaudio") != 0 &&
        subclass(class, spcSoundLink)) return;

/* remove actions are handled in a special fast way */
    if (class == spcRemoveAction) {
      spId togo = lookup(getActionObj_(id));
      if (togo) {
        ZZ(OBJ) zprintf("pom: removing obj (0x%08x-%s)\n",
         togo, getClassName(getClass(togo)));
        Z(OBJ) removeCNT++;
        spRemove(togo);
      }
    }
    else if ((existingId = lookup(getName(id)))) {
      if (getClass(existingId) == spcSlot) {
        newId = createNewObj(id);
        handleSpIdChange(existingId, newId);
        spRemove(existingId);
        ZZ(OBJ) zprintf("pom: replacing slot with new obj (0x%08x-%s)\n",
         newId, getClassName(getClass(newId)));
        Z(OBJ) slotupgradeCNT++;
        return;
      }
      if (getTimeOfUpdate(id) < getTimeOfUpdate(existingId)) {
        ZZ(OBJ) zprintf("pom: stale info for current obj (0x%08x-%s)\n",
         existingId, getClassName(getClass(existingId)));
        Z(OBJ) staleCNT++;
        return;
      }
      if (getTimeOfUpdate(id) == getTimeOfUpdate(existingId)) {
        ZZZ(OBJ) zprintf("pom: repeat info for current obj (0x%08x-%s)\n",
          existingId, getClassName(getClass(existingId)));
        Z(OBJ) repeatCNT++;
        return;
      }
      ZZZ(OBJ) zprintf("pom: new info for current obj (0x%08x-%s)\n",
       existingId, getClassName(getClass(existingId)));
      Z(OBJ) updateCNT++;

if (subclass(getClass(existingId), spcPOV)) {
        spLocale oldlid = getBeaconLocaleId(existingId);
        spLocale newlid = getBeaconLocaleId(id);

if (oldlid != newlid) POVEnteringFrom(newlid, oldlid);
      }
      updateExistingObj(existingId, id);
      ZZZZ(OBJ) spPrint(existingId);
    }
    else {
      newId = createNewObj(id);
      if (subclass(getClass(newId), spcPOV))
        POVEnteringFrom(getBeaconLocaleId(newId), NOLOCALE);
      Z(OBJ) zprintf("pom: added new obj (0x%08x-%s)\n",
       newId, getClassName(getClass(newId)));
      Z(OBJ) newCNT++;
      ZZZZ(OBJ) spPrint(newId);
    }
  }

/* allocates space the caller must free */
  char *readFileIntoBuffer(char *fname, int * dataSize)
  {
    int fp;
    int sofar = 0;
    int count;
    char *buffer;
```

```
  int buffersize;
  struct stat s;

if (!assert((fp = open(fname, O_RDONLY)) != -1)) return NULL;
  zero(fstat(fp, &s));
  buffersize = s.st_size;
  assert((buffer = (char *)malloc(buffersize + 1)) != NULL);
  while (sofar < buffersize) {
    count = read(fp, buffer+sofar, buffersize-sofar);
    if (count == -1) { /* error */
      zwarn("Failed to read all of %s.\n", fname);
      return NULL;
    }
    sofar += count;
    if (count == 0) { /* whole file read */
      break;
    }
  }
  *(buffer+sofar) = '\0';
  close(fp);
  if (dataSize) *dataSize = buffersize;
  return buffer;
}

/* This crudely gets a long int parameter out of a Link arg, It
   assumes the 'parameter' name string appears only as such and not in
   any values. */ long int getLongParam(char * paramName, char * argString) {
  long int value;
  char * x;

if (!argString || !paramName || !strcmp(paramName, "")) return 0;
  x = strstr(argString, paramName);
  if (!x) return 0;
  x = x + strlen(paramName);
  if (!x) return 0;
  x = x + strspn(x, " =");
  sscanf(x, "%ld", &value);
  return value;
}

/* This may return a buffer the caller must free. */
/* This may create a file that needs to be deleted. */
/* Use freeURLFile to clean up. */
char *getURLFile(char *url) {
  static int counter = 0;
  char tmppath[MAXPATHLEN];
  char cmd[2*MAXPATHLEN];
  char extension[20];
  char *dot;
  char *ret;
  char *p;

if (strncmp(url, "file:", 5) == 0) {
    p = url+5;
  }
  else {
    if (url[0] == '/' || strchr(url, ':') == NULL) {
      zwarn("%s does not appear to be a URL\n", url);
    }
    extension[0] = '\0';
    dot = strrchr(url, '.');
    if (dot) strcpy(extension, dot);
    sprintf(tmppath, "/tmp/sp%d%d%s", (int) getpid(), counter++, extension);
    sprintf(cmd, "www_3.0 -source %s -o %s > /dev/null;chmod 666 %s",
      url, tmppath, tmppath);
```

- 51 -

```c
    assert(system(cmd) != -1);
    p = tmppath;
  }
  assert(ret = (char *) malloc(strlen(p)+1));
  strcpy(ret, p);
  return ret;
} void freeURLFile(char *url, char *fn) {
  if (strncmp(url, "file:", 5) != 0) {
    zero(unlink(fn));
  }
  free(fn);
}

/* This returns a buffer the caller must free. */
char *getURLData(char *URL, int *bytes) {
  char *f = getURLFile(URL);
  char *r = readFileIntoBuffer(f, bytes);

freeURLFile(URL, f);
  return r;
} typedef void ClassFn(spId id);

void doClassFn(spId id) {
  static int warnings = 0;
  ClassFn * fn;

fn = ((ClassFn *)(methodTable[getClassFn(getClass(id))]));
  if (fn == NULL) {
    if (warnings++ < 5)
      zwarn("%s has no class function\n", getClassName(getClass(id)));
  }
  else fn(id);
}

/* These are the special class functions */

/* DoSoundAction, doSourceAction are in audiomodule.c */

/* For the moment, this does nothing */
void doAppearanceLink(spId id) {
  /* The appearance is loaded via a callback in spvisual */
}

/* This code is never actually run, because remove actions are never
   actually put in the world model, but rather are just directly sent
   as messages by spRemove and interpreted directly on receipt by
   processObjMsg.  However, they would work (slowly) if you made them. */ void doRemoveAction(spId id) {
  spId remId = getActionObj(id);
  if (remId) spRemove(remId);
  actionRemoveSelf(id);
} void doOwnershipRequest(spId id) {return;}

/* A text link is a link where the data is a string < 500 chars long.
   It is specifed directly in the link arg,  The URL must be NULL. */ void doTextLink(spId id) {
  int len = strlen(getLinkArg(id));

if (getLinkURL(id)[0]!=0)
```

```
    zwarn("TextLinks don't need URLs \"%s\"\n", getLinkURL(id));
  setLinkData(id, getLinkArg(id));
  setStreamFormat(id, SP1ASCII8MONO);
  setStreamDuration(id, len);
  setStreamBytes(id, len);
}

/* Locale links */

/* A locale file is a list of entries of the following form:
   Things are in ascii at the moment to facilitate debugging.

1) a symbolic locale name beginning in column 1
   followed by information on lines starting with a SPACE.
 A) The locale id (hex long), and the number of neighbors (int)
 B) a line containing the boundary data (6 floats of box 2 floats radii)
 C) groups of lines for each neighbor
    a) id of neighbor (hex long)
    b) transform (16 floats, column major order)
    c) reverse transform (16 floats, column major order)

for example you might have:

MainConcourse
 ...

DicksRoom
 0x23 2
 0.0 1.0 0.0 1.0 0.0 1.0  1.14  1.0
 0x10
  1.0 0.0 0.0 0.0   0.0 1.0 0.0 0.0   0.0 0.0 1.0 0.0   1.0 0.0 0.0 1.0
  1.0 0.0 0.0 0.0   0.0 1.0 0.0 0.0   0.0 0.0 1.0 0.0  -1.0 0.0 0.0 1.0
 0x11
  1.0 0.0 0.0 0.0   0.0 1.0 0.0 0.0   0.0 0.0 1.0 0.0   0.0 1.0 0.0 1.0
  1.0 0.0 0.0 0.0   0.0 1.0 0.0 0.0   0.0 0.0 1.0 0.0   0.0 -1.0 0.0 1.0

Cafe
 ...   */ define BUFLEN 200
void doLocaleLink(spId id) {
  char * name = getLinkArg(id);
  int nameLen = strlen(name);
  char * filename;
  FILE * f;
  char buffer[BUFLEN];
  struct LocaleNeighbor ** data1;
  struct LocaleNeighbor * data2;
  spLocale localeId;
  int i, numNeighbors;
  struct _spBoundary B;
  spTMatrix M;

if (0==strcmp(getLinkURL(id), "")) {
    setLocaleId(id, 0);
    return; /* default NULL locale */
  }
  filename = getURLFile(getLinkURL(id));
  if ((f = fopen(filename, "r")) == NULL) {
    zwarn("Can't open locale link url %s\n", getLinkURL(id));
    freeURLFile(getLinkURL(id), filename);
    return;
  }
  do {
    if (!(fgets(buffer, BUFLEN, f))) {
      zwarn("did not find locale \"%s\" in \"%s\"\n",
      getLinkArg(id), getLinkURL(id));
```

```
      fclose(f);
      freeURLFile(getLinkURL(id), filename);
      return;
    }
  }
  while (!(nameLen ? (buffer[nameLen]=='\n'
       && 0==strncmp(name, buffer, nameLen))
    : (buffer[0]!=' ' && buffer[0]!='\n' && buffer[0]!=0)));
  assert(2==fscanf(f,"%lx %d", &localeId, &numNeighbors));
  setLocaleId(id, localeId);
  setLocaleNumNeighbors(id, numNeighbors);
  assert(8==fscanf(f, "%f %f %f %f %f %f  %f %f",
   &B.bbox[0], &B.bbox[1], &B.bbox[2], &B.bbox[3], &B.bbox[4],
   &B.bbox[5], &B.outRadius, &B.inRadius));
  setLocaleBoundary(id, &B);
  if (numNeighbors) {
    assert(data1 = (struct LocaleNeighbor **)calloc(1, numNeighbors*
     (sizeof(void *)+
      sizeof(struct LocaleNeighbor))));
    data2 = (struct LocaleNeighbor *)(data1 + numNeighbors);
    for (i = 0; i<numNeighbors; i++) {
      assert(1==fscanf(f, "%lx", &localeId));
      data2[i].localeId = localeId;
      assert((16==fscanf(f, "%f %f %f %f %f %f %f %f %f %f %f %f %f %f %f %f",
  &M.mx[0], &M.mx[1], &M.mx[2], &M.mx[3], &M.mx[4],
  &M.mx[5], &M.mx[6], &M.mx[7], &M.mx[8], &M.mx[9],
  &M.mx[10], &M.mx[11], &M.mx[12], &M.mx[13],
  &M.mx[14], &M.mx[15])));
      data2[i].transform = M;
      assert((16==fscanf(f, "%f %f %f %f %f %f %f %f %f %f %f %f %f %f %f %f",
  &M.mx[0], &M.mx[1], &M.mx[2], &M.mx[3], &M.mx[4],
  &M.mx[5], &M.mx[6], &M.mx[7], &M.mx[8], &M.mx[9],
  &M.mx[10], &M.mx[11], &M.mx[12], &M.mx[13],
  &M.mx[14], &M.mx[15])));
      data2[i].reverseTransform = M;
      data1[i] = &data2[i];
    }
    setLinkData(id, (void *)data1);
  }
  informNetworkLocaleIsReady(getLocaleId(id), id);
  fclose(f);
  freeURLFile(getLinkURL(id), filename);
}
```

Having above indicated a preferred embodiment of the present invention, it will occur to those skilled in the art that modifications and alternatives can be practiced within the spirit of the invention. It is accordingly intended to define the scope of the invention only as indicated in the following claims.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for eliminating time consuming unnecessary transfers of data over a network, while at the same time guaranteeing timeliness of data used by a recipient node of said network, comprising:

a source of data coupled to said network, means at said source for sending a command in the form of a small positive data-notification message over said network for each version of said data to indicate that a recipient node should obtain a particular version of a particular data item;

means at said recipient node and responsive to said small data-notification message for determining whether the data corresponding to said small data-notification message is already present; and, means at said recipient node for fetching the data specified by said small data positive notification message if not already present at said recipient node, whereby said source commands via said small positive data-notification message that appropriate new data be fetched and available at said recipient node if not already there.

2. The system of claim 1, wherein said small data-notification message includes a checksum and data location.

3. The system of claim 2, and further including means at said recipient node and responsive to said checksum for ascertaining the validity of the corresponding data fetched over said network.

4. The system of claim 2, wherein said network is the World Wide Web and wherein said data location is a uniform resource locator URL.

5. The system of claim 2, wherein said determining means at said recipient node includes means at said recipient node for storing a previous small data-notification message and the corresponding data.

6. The system of claim 5, wherein said determining means at said recipient node further includes means for ascertaining whether for a received small data-notification message there exists a stored small data-notification message with the same data location and checksum, this being true indicating that the corresponding data is already available at said recipient node.

7. The system of claim 5, wherein said determining means at said recipient node further includes means for ascertaining whether for a received small data-notification message there exists a stored small data-notification message with the same data location and a different checksum, this being true indicating that the corresponding data has changed and needs to be refetched.

8. The system of claim 5, wherein said determining means at said recipient node further includes means for ascertaining whether for a received small data-notification message there exists a stored small data-notification message with the same data location, this being false indicating that the corresponding data is new and needs to be fetched.

9. The system of claim 5, wherein said small data-notification message includes a timestamp and wherein said determining means at said recipient node further includes means for ascertaining whether for a received small data-notification message there exists a stored small data-notification message with the same data location and a later timestamp, this being true indicating that said received small data-notification message is not timely and should be ignored.

* * * * *